US010009722B2

(12) United States Patent
Rekimoto

(10) Patent No.: US 10,009,722 B2
(45) Date of Patent: Jun. 26, 2018

(54) WIRELESS COMMUNICATION DEVICE, WIRELESS COMMUNICATION METHOD, INFORMATION PROCESSING DEVICE, INFORMATION PROCESSING METHOD, AND PROGRAM

(71) Applicant: SONY CORPORATION, Tokyo (JP)

(72) Inventor: Junichi Rekimoto, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days. days.

(21) Appl. No.: 15/377,153

(22) Filed: Dec. 13, 2016

(65) Prior Publication Data
US 2017/0094462 A1 Mar. 30, 2017

Related U.S. Application Data

(60) Continuation of application No. 14/968,031, filed on Dec. 14, 2015, which is a continuation of application
(Continued)

(30) Foreign Application Priority Data

Mar. 29, 2007 (JP) ................................ 2007-088792

(51) Int. Cl.
*H04W 24/00* (2009.01)
*H04W 4/021* (2018.01)
(Continued)

(52) U.S. Cl.
CPC ............. *H04W 4/021* (2013.01); *H04L 43/16* (2013.01); *H04L 63/0407* (2013.01);
(Continued)

(58) Field of Classification Search
CPC ....... H04W 4/04; H04W 48/04; H04W 40/20; H04W 4/02
(Continued)

(56) References Cited

U.S. PATENT DOCUMENTS 6,505,048 B1  1/2003  Moles et al.
6,665,534 B1  12/2003  Conklin et al.
(Continued)

FOREIGN PATENT DOCUMENTS

CN  1618251 A  5/2005
CN  1774090  5/2006
(Continued)

OTHER PUBLICATIONS

Apr. 18, 2014, Chinese Office Action for related CN application No. 201110422376.8.
(Continued)

*Primary Examiner* — Marcos Batista
(74) *Attorney, Agent, or Firm* — Paratus Law Group, PLLC

(57) ABSTRACT

A wireless communication device includes a transmission portion, an information acquisition portion, a storage portion, a selection portion, and a transmission control portion. The transmission portion transmits information. The information acquisition portion acquires location information for the wireless communication device that includes a received signal strength of a signal that is transmitted from a base station in the vicinity. The storage portion stores, in association with specific location information, regulating information that regulates the transmission from the transmission portion of the information that corresponds to the location of the wireless communication device. The selection portion selects from the storage portion the regulating information associated with the location information acquired by the information acquisition portion. The transmission control portion controls, based on the regulating information that was selected by the selection portion, the transmission from the transmission portion of the information that corresponds to the location of the wireless communication device.

18 Claims, 17 Drawing Sheets

Related U.S. Application Data

No. 14/288,973, filed on May 28, 2014, now Pat. No. 9,215,557, which is a continuation of application No. 13/188,578, filed on Jul. 22, 2011, now Pat. No. 8,761,794, which is a division of application No. 12/057,078, filed on Mar. 27, 2008, now Pat. No. 8,676,225.

(51) Int. Cl.
    *H04L 29/06*   (2006.01)
    *H04W 4/02*    (2018.01)
    *H04W 12/02*   (2009.01)
    *H04L 29/08*   (2006.01)
    *H04L 12/26*   (2006.01)

(52) U.S. Cl.
    CPC .............. *H04L 67/18* (2013.01); *H04W 4/02* (2013.01); *H04W 12/02* (2013.01)

(58) Field of Classification Search
    USPC ............................ 455/456.1–456.3; 370/338
    See application file for complete search history.

(56) References Cited

U.S. PATENT DOCUMENTS

| | | | |
|---|---|---|---|
| 6,701,144 B2 | 3/2004 | Kirbas et al. | |
| 6,813,558 B1 | 11/2004 | Lapstun et al. | |
| 6,952,645 B1 | 10/2005 | Jones | |
| 6,968,179 B1 | 11/2005 | De Vries | |
| 6,973,333 B1 | 12/2005 | O'Neil | |
| 7,072,670 B2 | 7/2006 | Sato et al. | |
| 7,130,644 B2 | 10/2006 | Kuwahra et al. | |
| 7,216,147 B2 | 5/2007 | Blagsvedt et al. | |
| 7,720,037 B2 | 5/2010 | Bill | |
| 7,801,542 B1* | 9/2010 | Stewart | G06Q 50/01 455/414.1 |
| 7,813,743 B1 | 10/2010 | Loeb et al. | |
| 7,840,224 B2 | 11/2010 | Vengroff et al. | |
| 7,996,021 B2 | 8/2011 | Brauel et al. | |
| 2002/0026518 A1 | 2/2002 | Ueda et al. | |
| 2002/0028684 A1 | 3/2002 | Kuwahra et al. | |
| 2002/0035605 A1 | 3/2002 | McDowell et al. | |
| 2002/0055362 A1 | 5/2002 | Aoyama | |
| 2002/0065068 A1 | 5/2002 | Nobukiyo | |
| 2002/0065894 A1 | 5/2002 | Dalal et al. | |
| 2002/0077118 A1 | 6/2002 | Zellner et al. | |
| 2002/0111173 A1 | 8/2002 | Hendrey et al. | |
| 2002/0164997 A1 | 11/2002 | Parry | |
| 2003/0023726 A1 | 1/2003 | Rice et al. | |
| 2003/0043073 A1 | 3/2003 | Gray et al. | |
| 2003/0104819 A1 | 6/2003 | Knauerhase et al. | |
| 2003/0109265 A1 | 6/2003 | Yamamoto et al. | |
| 2003/0225843 A1 | 12/2003 | Sakata | |
| 2004/0006548 A1 | 1/2004 | Mahmood | |
| 2004/0121784 A1* | 6/2004 | Park | H04W 64/00 455/456.1 |
| 2004/0122901 A1 | 6/2004 | Sylvain | |
| 2004/0127229 A1 | 7/2004 | Ishii | |
| 2004/0166878 A1 | 8/2004 | Erskine et al. | |
| 2004/0176107 A1 | 9/2004 | Chadha | |
| 2004/0248591 A1 | 12/2004 | Fish | |
| 2004/0259574 A1 | 12/2004 | Daniels et al. | |
| 2005/0070310 A1 | 3/2005 | Caspi et al. | |
| 2006/0230137 A1 | 10/2006 | Gare et al. | |
| 2006/0270419 A1 | 11/2006 | Crowley et al. | |
| 2007/0003051 A1 | 1/2007 | Kiss et al. | |
| 2007/0032194 A1 | 2/2007 | Griffin | |
| 2007/0072591 A1* | 3/2007 | McGary | H04W 4/02 455/414.1 |
| 2007/0150444 A1 | 6/2007 | Chesnais et al. | |
| 2007/0249288 A1 | 10/2007 | Moallemi et al. | |
| 2007/0281716 A1 | 12/2007 | Altman et al. | |
| 2008/0031203 A1 | 2/2008 | Bill | |
| 2008/0086261 A1 | 4/2008 | Robinson et al. | |
| 2008/0133336 A1 | 6/2008 | Altman et al. | |
| 2008/0160976 A1 | 7/2008 | Virolainen et al. | |
| 2008/0214161 A1 | 9/2008 | Jakl | |
| 2009/0322890 A1 | 12/2009 | Bocking et al. | |

FOREIGN PATENT DOCUMENTS

| | | |
|---|---|---|
| JP | 10-079972 | 3/1998 |
| JP | 2002-016956 | 1/2002 |
| JP | 2002-345012 | 11/2002 |
| JP | 2003-230172 | 8/2003 |
| JP | 2005-073001 | 3/2005 |
| JP | 2005-525003 | 8/2005 |
| JP | 2006-140544 | 1/2006 |
| JP | 2006-237981 | 9/2006 |
| WO | WO2006/070877 | 7/2006 |

OTHER PUBLICATIONS

Feb. 5, 2013, Japanese Office Action for related JP application No. 2011-26092.

Jun. 7, 2011, Japanese Office Action for related JP application No. 2010-090780.

Jun. 7, 2011, Japanese Office Action for related JP application No. 2009-068667.

\* cited by examiner

FIG.5

| BASE STATION ID | RECEIVED SIGNAL STRENGTH |
|---|---|
| 30A | −90Dbm |
| 30B | −70Dbm |
| 30C | −80Dbm |
| 30D | −75Dbm |
| ⋮ | ⋮ |

FIG.6

| BASE STATION ID | LONGITUDE | LATITUDE |
|---|---|---|
| 30A | 135.001 | 35.49 |
| 30B | 135.002 | 35.41 |
| 30C | 135.003 | 35.50 |
| 30D | 135.002 | 35.42 |
| ⋮ | ⋮ | ⋮ |

| LATITUDE | LONGITUDE | PUBLISH/DO NOT PUBLISH | LOCATION ALIAS |
|---|---|---|---|
| 35.6597 | 139.7019 | DO NOT PUBLISH | HOME |
| 35.6259 | 139.7304 | PUBLISH | COMPANY |
| ⋮ | ⋮ | ⋮ | ⋮ |

FIG.9

|       | 400 |
|       |  ↙  |

| | ⊘ FriendSensor - juntalk | |
|---|---|---|
| 410 — | SHIBUTO-KU, SHIBUYA 2-CHOME | |
| 420 — | ⊘ Five: SHIBUTO-KU, SAKURAOKA-CHO 420 | 284m |
| 430 — | ⊗ Taro: KOHOKU-KU, MINAMI-AOYAMA 5-CHOME 430 | 1.1km |
| 440 — | ⊘ Smile: LUNCH 440 | 2.7km |
| 450 — | ⊘ Buli: COMPANY 450 | 4.4km |
| 460 — | ⊘ Peco: GODAIBA 460 | 8km |
| 470 — | ⊘ Kuro: BUSINESS TRIP 470 | 366km |
| 480 — | ⊘ Seven | |
| 490 — | ⊗ Shiro | |

FIG.12A
[SHIBUTO-KU, SHIBUYA 2-CHOME LATITUDE 35.6597 LONGITUDE 139.7019]

FIG.12B
[HOME (SHIBUTO-KU, SHIBUYA 2-CHOME) LATITUDE 35.6597 LONGITUDE 139.7019]

FIG.12C
[HOME]

FIG.12D
[NO INFORMATION TRANSMITTED]

FIG.13

| | HOME | | COMPANY | | MEETING PLACE | | |
|---|---|---|---|---|---|---|---|
| BASE STATION ID | RECEIVED SIGNAL STRENGTH | BASE STATION ID | RECEIVED SIGNAL STRENGTH | BASE STATION ID | RECEIVED SIGNAL STRENGTH | | |
| 30A | −90Dbm | 30E | −82Dbm | 30I | −76Dbm | ... | ... |
| 30B | −70Dbm | 30F | −73Dbm | 30J | −80Dbm | | |
| 30C | −80Dbm | 30G | −80Dbm | 30K | −80Dbm | | |
| 30D | −75Dbm | 30H | −77Dbm | 30L | −78Dbm | | |
| ... | | ... | ... | ... | ... | | |

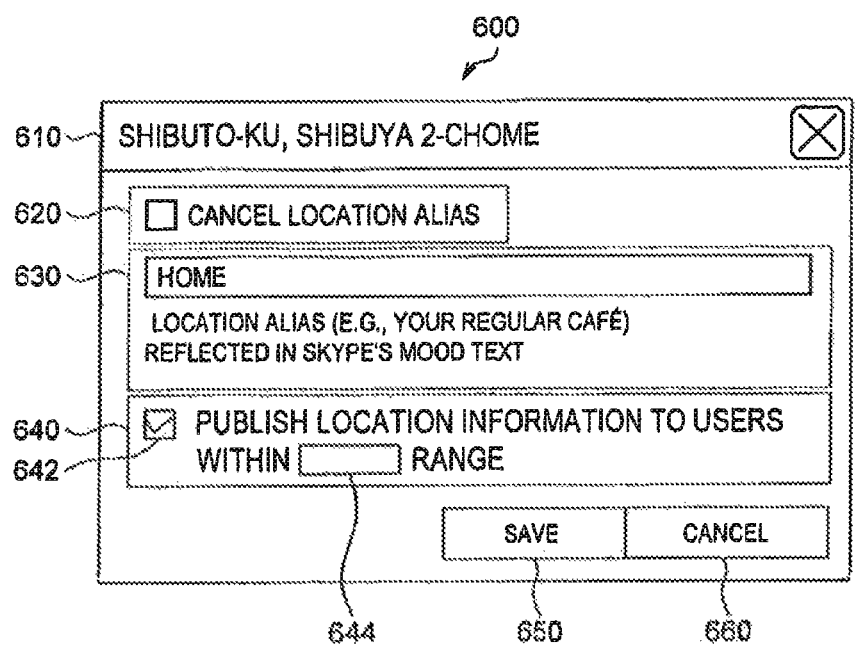

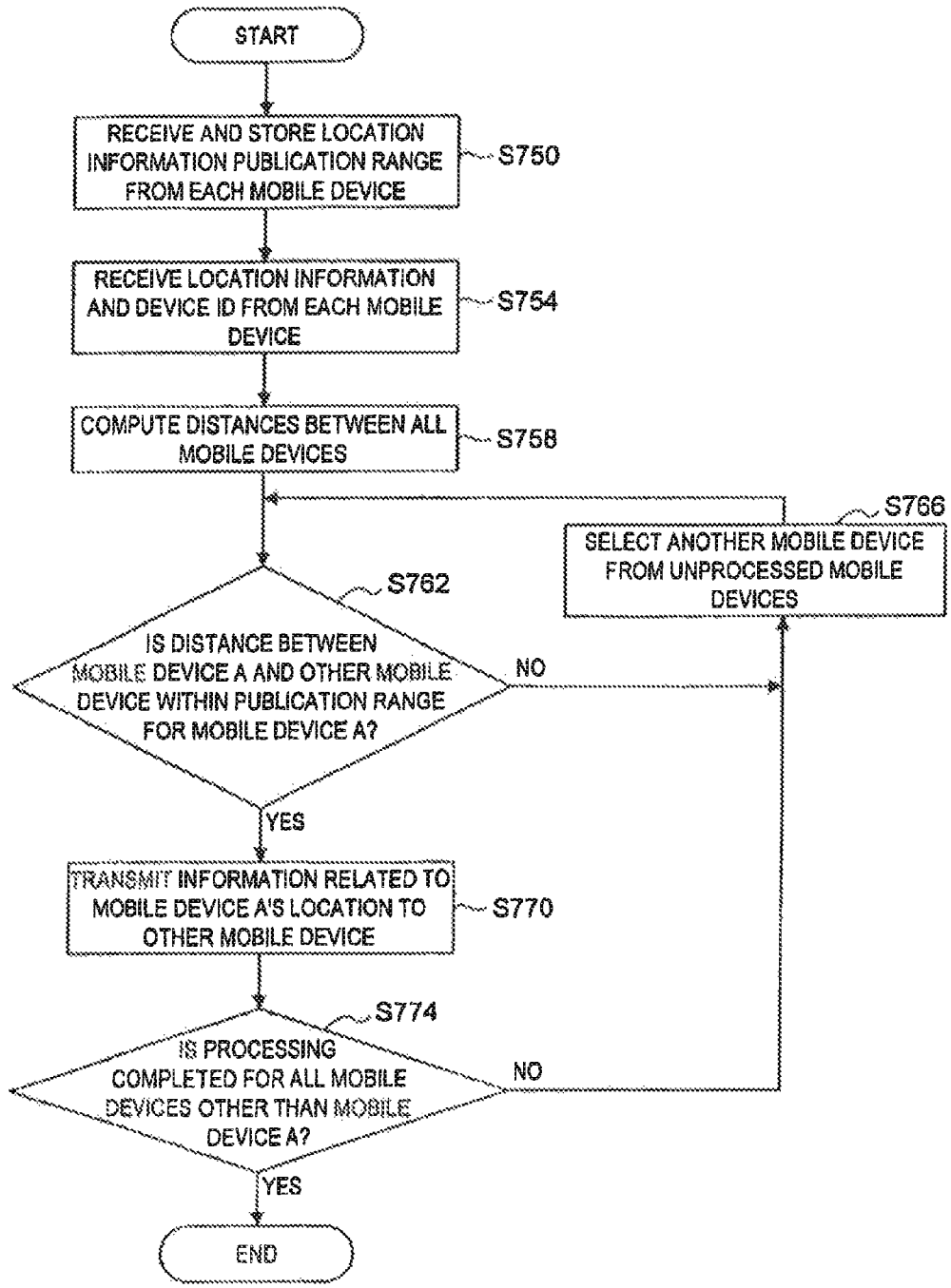

WIRELESS COMMUNICATION DEVICE, WIRELESS COMMUNICATION METHOD, INFORMATION PROCESSING DEVICE, INFORMATION PROCESSING METHOD, AND PROGRAM

CROSS REFERENCES TO RELATED APPLICATION(S)

This application is a continuation of U.S. patent application Ser. No. 14/968,031 (filed on Dec. 14, 2015) which is a continuation of U.S. patent application Ser. No. 14/288,973 (filed on May 28, 2014 and issued as U.S. Pat. No. 9,215,557 on Dec. 15, 2015), which is a continuation of U.S. patent application Ser. No. 13/188,578 (filed on Jul. 22, 2011 and issued as U.S. Pat. No. 8,761,794 on Jun. 24, 2014), which is a divisional of U.S. patent application Ser. No. 12/057,078 (filed on Mar. 27, 2008 and issued as U.S. Pat. No. 8,676,225 on Mar. 18, 2014), which claims priority to Japanese Patent Application No. 2007-088792 (filed on Mar. 29, 2007), which are all hereby incorporated by reference in their entirety.

BACKGROUND OF THE INVENTION

1. Field of the Invention

The present invention relates to a wireless communication device, a wireless communication method, an information processing device, an information processing method, and a program.

2. Description of the Related Art

Networking services such as instant messaging (IM), social networking systems (SNS), Web diaries, and the like are being widely used these days by individual users with communication devices to publish information about themselves. The user information may include, for example, information as to whether the communication device is online or not, or current status information that the users themselves set manually (studying, taking a break, in a meeting, or the like).

The users can also publish location information about themselves that the communication devices acquire using location estimation technologies such as the Global Positioning System (GPS), Wireless Fidelity (Wi-Fi), and the like. The users' publishing of their location information opens a range of possibilities. For example, if the user can know that a friend is close by, he can invite that friend to lunch. If the friend has gone to a sightseeing spot, the user can ask the friend for his impressions of the area. If the friend is working at his company, the user can know that his friend is not available for leisure activities, and so on. That is, of every user publishes his own location information, every user can know every other user's location and can utilize that location information in communicating with the other users.

Further, in Japanese Patent Application Publication No. JP-A-2002-345012, technology is disclosed that is related to a system that provides to a third party the user's location information described above. Specifically, in Japanese Patent Application Publication No. JP-A-2002-345012, a mobile wireless terminal device is disclosed that controls whether location information that is measured by OPS is published or location information other than the actual location is published, depending on the communication partner.

SUMMARY OF THE INVENTION

However, with the known mobile wireless terminal device, it is not possible to control, based on where the user is located, whether or not the location information is published. Therefore, with the known mobile wireless terminal device, the user's location information is published even when the user is at home or at work, so that the location of the user's home or workplace is provided to a third party in some cases. That is, a problem with the known mobile wireless terminal device is that the user's privacy cannot be adequately protected.

Accordingly, the present invention addresses the problem described above to provide a wireless communication device, a wireless communication method, an information processing device, an information processing method, and a program that are new and improved and that can enhance protection of information related to the current location.

According to an embodiment of the present invention, there is provided a wireless communication device that includes a transmission portion, an information acquisition portion, a storage portion, a selection portion, and a transmission control portion. The transmission portion transmits information. The information acquisition portion acquires location information of the wireless communication device, the location information including at least one of information that indicates a location of the wireless communication device or a received signal strength of a signal that is transmitted from a base station in the vicinity of the wireless communication device. The storage portion stores, in association with arbitrary location information, regulating information that regulates the transmission from the transmission portion of the information that corresponds to the location of the wireless communication device. The selection portion selects from the storage portion the regulating information that is associated with the location information that was acquired by the information acquisition portion. The transmission control portion controls, in accordance with the regulating information that was selected by the selection portion, the transmission from the transmission portion of the information that corresponds to the location of the wireless communication device.

In this configuration, the location information for the wireless communication device that the information acquisition portion acquires includes one of latitude and longitude data that indicate the location of the wireless communication device, the received signal strength of the signal that is transmitted from the base station in the vicinity of the wireless communication device, which is uniquely obtainable in the location of the wireless communication device, and the like. Further, the information from the transmission portion that corresponds to the location of the wireless communication device, for example, the regulating information that regulates the transmission of the location information for the wireless communication device, is stored in the storage portion in association with the location information for the wireless communication device. The selection portion selects from the storage portion the regulating information that is associated with the location information for the wireless communication device, and the transmission control portion, in accordance with the selected regulating information, controls the transmission from the transmission portion of the information that corresponds to the location of the wireless communication device. That is, the wireless communication device can control the transmission of the information that corresponds to its own location, based on one of its own location and the received signal strength of the signal that is transmitted from the base station in the vicinity.

The regulating information may also include information that regulates whether or not the location information for the wireless communication device is transmitted to the transmission portion, and the transmission control portion may also control, in accordance with the regulating information that was selected by the selection portion, whether or not the location information for the wireless communication device is transmitted from the transmission portion. For example, in a case where the regulating information that was selected by the selection portion prohibits the transmission of the location information for the wireless communication device, the transmission control portion prohibits the transmission from the transmission portion of the location information for the wireless communication device. That is, the wireless communication device can control, according to its own location, whether or not its own location information is transmitted. In this manner, the wireless communication device can control, according to its current location, that is, according to the current location of the user of wireless communication device, whether or not its own location information is transmitted. This makes it possible to enhance the protection of information pertaining to the current location of the wireless communication device and the user of wireless communication device.

The regulating information may also include information for transmission that expresses the location information, with which the information for transmission is associated in the storage portion, in a different form, and the transmission control portion may also transmit to the transmission portion the information for transmission that is included in the regulating information that was selected by the selection portion. In this case, the information for transmission is information that expresses the location information in a different form. For example, the information for transmission may be information that describes a place, such as a home, a company, a café, or the like, that is in the location indicated by the associated location information. The information for transmission may also be information that indicates a status, such as "going home", "in a meeting", "free time", or the like, in accordance with the location indicated by the associated location information. Therefore, if the transmission control portion transmits the information for transmission to the transmission portion based on the regulating information, it is possible to publish the information that corresponds to the location of the wireless communication device without publishing the location information for the wireless communication device to a third party.

In a case where the regulating information that corresponds to the location information for the wireless communication device that was acquired by the information acquisition portion is not stored in the storage portion, the transmission control portion may also transmit to the transmission portion the location information for the wireless communication device that was acquired by the information acquisition portion. In this case, in a location for which there is no particular associated regulating information, the location information for the wireless communication device is transmitted, so it is possible for a third party to know the location of the wireless communication device.

The regulating information may also include effective period information that indicates an effective period for the regulating information, and the selection portion may also select the regulating information that corresponds to the location information acquired by the information acquisition portion and that is within the effective period. This is because there may be cases in which the user of the wireless communication device does not want to publish to a third party in a specific location or during a specific time period. For example, the user of the wireless communication device may want to publish to the third party when at work on a weekday, but may not want to publish to the third party when at work on a holiday. In this sort of case, if the effective period information that indicates the holiday is included in the regulating information that prohibits the transmission of the location information in the workplace, the wireless communication device does not transmit the location information when the user of the wireless communication device is in the workplace on the holiday. That is, setting the effective period in the regulating information makes it possible, for example, to control whether or not the location information for the wireless communication device is published according to the location of the wireless communication device and the current time. Thus the information pertaining to the user's current location can be even better protected.

A registration portion that registers the regulating information in the storage portion in association with the location information may also be provided in the wireless communication device. In this configuration, the registration portion can register the regulating information that the user of the wireless communication device wants to register in the storage portion in association with the location information, based on a regulating information registration operation that the user of the wireless communication device performs.

The storage portion may also store the received base station signal strength in association with the regulating information. Further, the selection portion may also select the regulating information that is associated with one of the received base station signal strength that matches the received base station signal strength that was acquired by the information acquisition portion and the received base station signal strength that resembles the received base station signal strength that was acquired by the information acquisition portion. In this configuration, it is possible to select the regulating information that is associated with the location information for the wireless communication device based on the received signal strength of the signal that the wireless communication device received from the base station in the vicinity, without estimating the location of the wireless communication device. Therefore, the need to store the location information for the base station in the wireless communication device and the need to query a location estimation server that estimates the location of the wireless communication device are eliminated. It thus becomes possible to scale back the hardware and reduce the processing load.

Further, in order to address the problem described above, according to another embodiment of the present invention, there is provided a program that causes a computer to function as a wireless communication device that includes a transmission portion, an information acquisition portion, a storage portion, a selection portion, and a transmission control portion. The transmission portion transmits information. The information acquisition portion acquires location information of the wireless communication device, the location information including at least one of information that indicates a location of the wireless communication device or a received signal strength of a signal that is transmitted from a base station in the vicinity of the wireless communication device. The storage portion stores in a storage medium, in association with arbitrary location information, regulating information that regulates the transmission from the transmission portion of the information that corresponds to the location of the wireless communication device. The selection portion selects from the storage portion the regulating information that is associated with the location information that was acquired by the information acquisition portion. The transmission control portion controls, in accordance with the regulating information that was selected by the selection portion, the transmission from the transmission portion of the information that corresponds to the location of the wireless communication device.

The program can perform the functions of the information acquisition portion, the storage portion, the selection portion, the transmission control portion, and the like described above in computer hardware resources that include, for example, a CPU, a ROM, a RAM, and the like. That is, it is possible to cause the computer that uses the program to function as the wireless communication device.

Further, in order to address the problem described above, according to another embodiment of the present invention, there is provided a wireless communication method. The wireless communication method includes a step of acquiring location information of a wireless communication device, the location information including at least one of information that indicates a location of the wireless communication device or a received signal strength of a signal that is transmitted from a base station in the vicinity of the wireless communication device. The wireless communication method also includes a step of selecting, from regulating information that is associated with arbitrary location information and that regulates transmission from a transmission device of information that is stored in a storage medium and that corresponds to the location of the wireless communication device, the regulating information that corresponds to the location information acquired. The wireless communication method also includes a step of controlling, in accordance with the regulating information that was selected from the storage medium, transmission from the transmission device of the information that corresponds to the location of the wireless communication device.

According to another embodiment of the present invention, there is provided an information processing device that can communicate with a plurality of communication devices. The information processing device includes a transmission portion, an information acquisition portion, a computation portion, and a transmission control portion. The transmission portion transmits information. The information acquisition portion acquires from each of the communication devices information from which it is possible to estimate a location of the communication device. The computation portion computes a distance between a first one of the communication devices and a second one of the communication devices based on the information acquired from each of the communication devices. The transmission control portion controls transmission from the transmission portion of information that corresponds to the location of the first communication device, based on the distance between the first communication device and the second communication device that was computed by the computation portion.

In this configuration, the computation portion computes a distance between the first communication device and the second communication device. The transmission control portion controls the transmission from the transmission portion of information that is based on the location of the first communication device, according to the distance between the first communication device and the second communication device that was computed by the computation portion. Therefore, the information processing device can control the information that is published to the second communication device according to the distance between the first communication device and the second communication device, without allowing the first communication device to know the distance to the second communication device.

In a case where the distance between the first communication device and the second communication device that was computed by the computation portion exceeds a specified set distance, the transmission control portion may also prohibit the transmission from the transmission portion of the location information for the first communication device. According to this configuration, the information processing device can prevent the publication of the location information for the first communication device, and information for transmission that expresses the location information in a different form, to the another of the communication devices when the another of the communication devices is located more than the specified set distance from the first communication device.

According to another embodiment of the present invention, there is provided a program that causes a computer to function as an information processing device that can communicate with a plurality of communication devices and that includes an information acquisition portion, a computation portion, and a transmission control portion. The information acquisition portion acquires from each of the communication devices information from which it is possible to estimate a location of the communication device. The computation portion computes a distance between a first one of the communication devices and a second one of the communication devices based on the information acquired from each of the communication devices. The transmission control portion controls transmission from a transmission device of information that corresponds to the location of the first communication device, based on the distance between the first communication device and the second communication device that was computed by the computation portion.

The program can perform the functions of the information acquisition portion, the computation portion, the transmission control portion, and the like described above in computer hardware resources that include, for example, a CPU, a ROM, a RAM, and the like. That is, it is possible to cause the computer that uses the program to function as the information processing device.

According to another embodiment of the present invention, there is provided an information processing method. The information processing method includes a step of acquiring from each of a plurality of communication devices information from which it is possible to estimate a location of the communication device. The information processing method also includes a step of computing a distance between a first one of the communication devices and a second one of the communication devices based on the information acquired from each of the communication devices. The information processing method also includes a step of controlling transmission of information that corresponds to the location of the first communication device, based on the computed distance between the first communication device and the second communication device.

According to the embodiments of the present invention described above, it is possible to enhance the protection of information pertaining to the current location of the wireless communication device.

BRIEF DESCRIPTION OF THE DRAWINGS

FIG. 5 is an explanatory figure that shows examples of signal strengths that are measured by an information acquisition portion;

FIG. 6 is an explanatory figure that shows examples of base station information that is stored in a storage portion;

FIG. 9 is an explanatory figure that shows an example of a display of information related to current locations of other mobile devices;

FIGS. 12A-12D are explanatory figures that show specific examples of information that is transmitted from a communication portion in the first embodiment;

FIG. 13 is an explanatory figure that shows an example of the regulating information that is stored in the storage portion in a modification example of the first embodiment:

FIG. 17 is an explanatory figure that shows an example of a regulating information registration screen:

FIG. 18 is an explanatory figure that shows an example of the regulating information that is stored in a storage portion of the control server according to the second embodiment;

FIG. 20 is a flowchart that shows a flow of an information processing method that is executed by the control server according to the second embodiment.

DETAILED DESCRIPTION OF THE PREFERRED EMBODIMENTS

Figure 1:
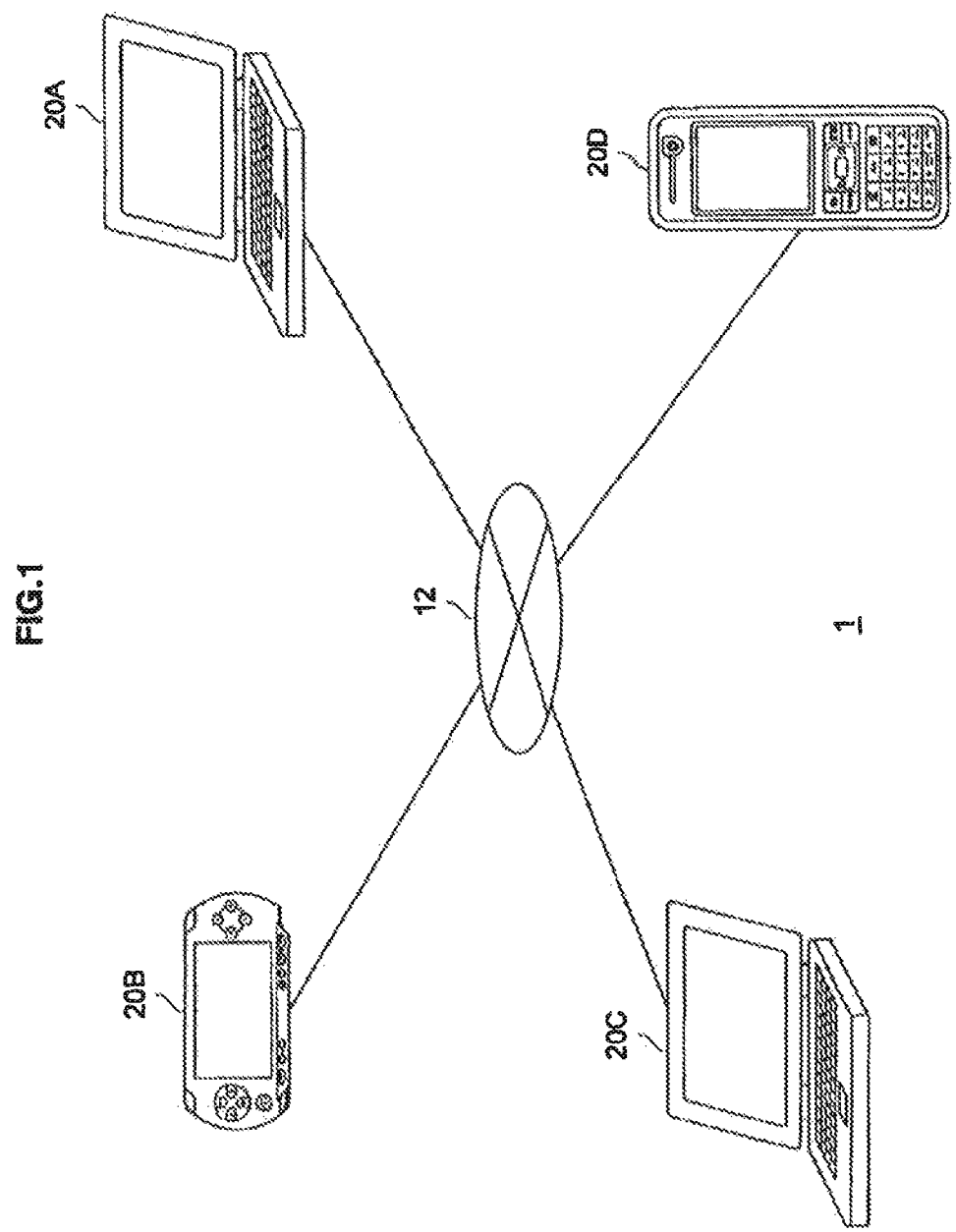
FIG. 1 is an explanatory figure that shows a configuration of a wireless communication system according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The preferred embodiments will be described in the order of the items shown below.

1. Description of a first embodiment of the present invention
1-1. Overview and purpose of a wireless communication system according to the first embodiment
1-2. Hardware configuration of a mobile device according to the first embodiment
1-3. Functions of the mobile device according to the first embodiment
1-3-1. Method of estimating location of the mobile device
1-3-2. Registration of regulating information
1-3-3. Transmission control based on the regulating information
1-3-4. Examples of other parties' location information displayed on the mobile device
1-4. Operation of the mobile device according to the first embodiment
1-5. Modification examples of the first embodiment
2. Description of a second embodiment of the present invention
2-1. Purpose of the second embodiment
2-2. Control server functions according to the second embodiment
2-3. Control server operation according to the second embodiment
3. Conclusion

1. DESCRIPTION OF A FIRST EMBODIMENT

1-1. Overview and Purpose of a Wireless Communication System According to the First Embodiment First, an overview and a purpose of a wireless communication system according to a first embodiment of the present invention will be described with reference to FIG. 1.

FIG. 1 is an explanatory figure that shows a configuration of a wireless communication system 1 according to the first embodiment. The wireless communication system 1 includes wireless communication devices such as a mobile device 20A, a mobile device 20B, a mobile device 20C, a mobile device 20D, and the like. Each mobile device 20 is connected through a communication network 12.

FIG. 1 shows a laptop personal computer (PCI as the mobile device 20A, a mobile game device as the mobile device 20B, a laptop PC as the mobile device 20C, and a mobile telephone as the mobile device 20D, but the mobile device 20 is not limited to these devices. For example, the mobile device 20 may also be a home image processing device (DVD recorder, video deck, or the like), a Personal Handyphone System (PHS), a mobile music playback device, a mobile image processing device, a personal digital assistant (PDA), a home game device, an electric appliance, or the like.

Furthermore, the communication network 12 may also include a fixed line cable such as a copper wire, an optical fiber cable, or the like, a data transmission channel such as radio waves or the like, a data relay device such as a router, a base station that controls communication, or the like, and so on.

Each mobile device 20 like those described above is provided with a function for acquiring location information that indicates the location of the mobile device 20 itself. Each mobile device 20 can also transmit and publish its own acquired location information to another mobile device 20 through the communication network 12. The publishing by each mobile device 20 of its own location information opens a range of possibilities. For example, if the user of the mobile device 20A can know that the user of the mobile device 20B, who is a friend, is close by, the user of the mobile device 20A can invite the user of the mobile device 20B to lunch. If the user of the mobile device 20A can know that the user of the mobile device 20C, who is a colleague, has gone to a high-class Japanese restaurant, the user of the mobile device 20A can ask the user of the mobile device 20C for his impressions of the restaurant. If the user of the mobile device 20A can know that the user of the mobile device 20D, who is a friend, is working at his company, the user of the mobile device 20A can know that the user of the mobile device 20D is not available for leisure activities, and so on. That is, if each mobile device 20 publishes its own location information, the user of each mobile device 20 can know the location information for the other users and can use the location information for the other users for communication with the other users.

However, there are cases in which the user of the mobile device 20, for reasons of privacy, does not want to disclose to a third party a specific location such as the user's home, workplace, school, favorite restaurant, or the like. Therefore, if the location information for the mobile device 20 were to be published regardless of the current location of the mobile device 20, it might create a problem for the user of the mobile device 20.

Accordingly, the first embodiment of the present invention was created to address this sort of situation. The protection of information related to the current location of the mobile device 20 and the user of the mobile device 20 can be enhanced by the first embodiment of the present invention. The configuration and operation of the mobile device 20 will be described in detail below.

Figure 2:
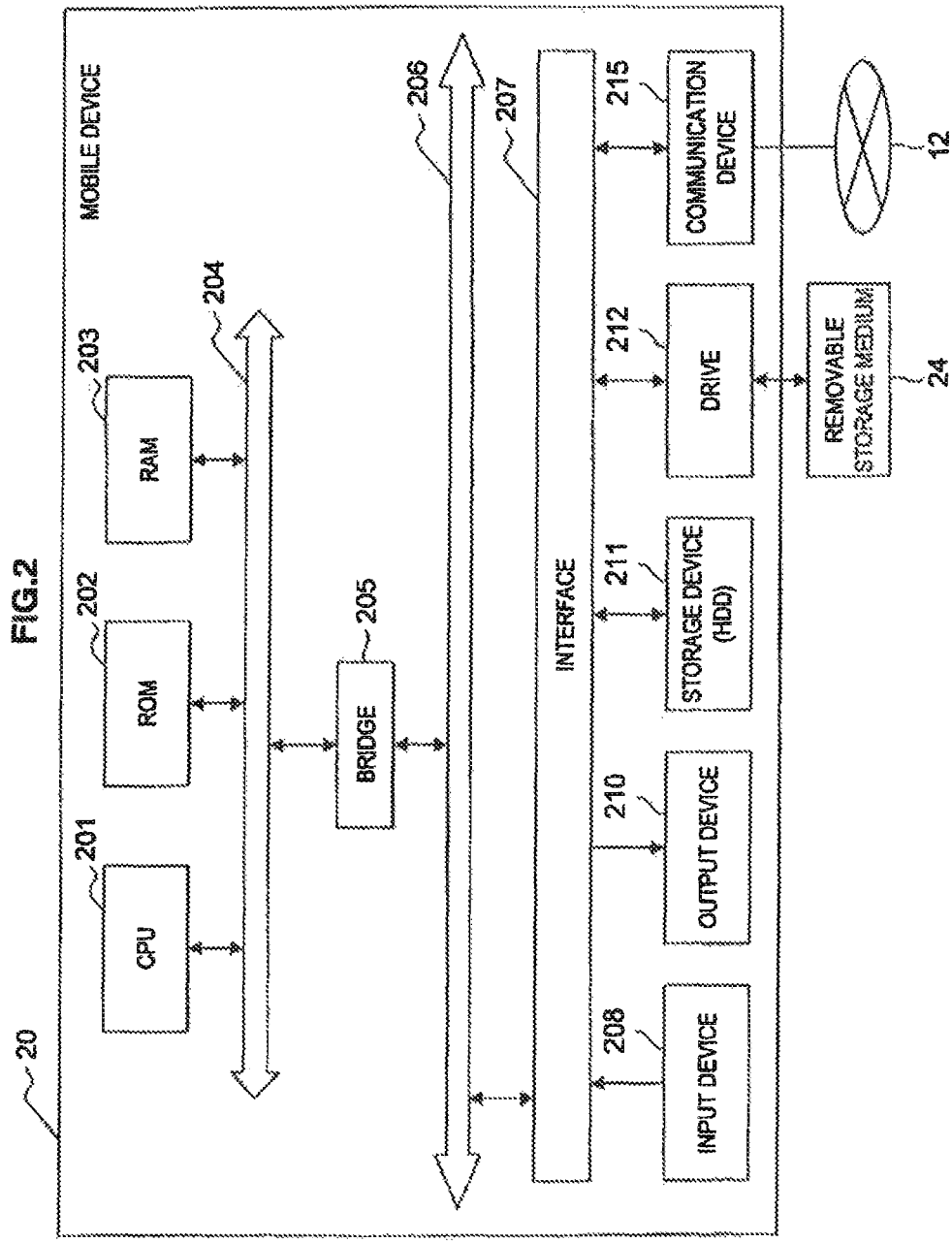
FIG. 2 is a block diagram that shows a hardware configuration of a mobile device according to the first embodiment.

1-2. Hardware Configuration of a Mobile Device According to the First Embodiment FIG. 2 is a block diagram that shows a hardware configuration of the mobile device 20. The mobile device 20 includes a central processing unit (CPU) 201, a read only memory (ROM) 202, a random access memory (RAM) 203, a host bus 204, a bridge 205, an external bus 206, an interface 207, an input device 20B, an output device 210, a storage device (HDD) 211, a drive 212, and a communication device 215.

The CPU 201 functions as an arithmetic processing unit and a control device and controls the overall operation of the mobile device 20 according to various types of programs. The CPU 201 may also be a microprocessor. The ROM 202 stores programs, computation parameters, and the like that are used by the CPU 201. The RAM 203 temporarily stores programs that are used in the operation of the CPU 201, parameters that are modified as necessary during the operation of the CPU 201, and the like. The CPU 201, the ROM 202, and the RAM 203 are interconnected by the host bus 204, which is configured from a CPU bus and the like.

The host bus 204 connects, through the bridge 205, to the external bus 206, which is a Peripheral Component Interconnect/Interface (PCI) bus or the like. Note that the discrete configuration of the host bus 204, the bridge 205, and the external bus 206 is not absolutely required, and the functions of the configuration may also be incorporated in to a single bus.

The input device 20B is configured from an input portion, an input control circuit, and the like. The input portion allows a user to input information and may be a mouse, a keyboard, a touch panel, a button, a microphone, a switch, a lever, or the like, for example. The input control circuit creates an input signal based on the user input and outputs the input signal to the CPU 201. By operating the input device 208, the user of the mobile device 20 can input various types of data to the mobile device 20 and command the mobile device 20 to perform processing operations.

The output device 210 is configured from a display unit, such as a cathode ray tube (CRT) unit, a liquid crystal display (LCD) unit, a lamp, or the like, and an audio output unit, such as a speaker, headphones, or the like. The output device 210 outputs, for example, content that is played back. Specifically, the display unit displays a text or an image of various types of information, such as played-back image data or the like. For its part, the audio output unit converts played-back audio data in to sound and outputs the sound.

The storage device 211 is a device for storing data that is configured as an example of a storage portion of the mobile device 20 according to the present embodiment. The storage device 211 can include a storage medium, a recording device that records the data in the storage medium, a reading device that reads the data from the storage medium, a deleting device that deletes the data that is recorded in the storage medium, and the like. The storage device 211 may be made up of a hard disk drive (HDD), for example. The storage device 211 drives the hard disk and stores programs that the CPU 201 executes and various types of data. Base station information, regulating information, and the like, which are described below, are also stored in the storage device 211.

The drive 212 is a reader-writer for the storage medium and can be built in to or attached externally to the mobile device 20. The drive 212 reads information that is recorded in a removable storage medium 24, such as a magnetic disk, an optical disk, a magneto-optical disk, a semiconductor memory, or the like that is mounted in the drive 212 and outputs the information to the RAM 203.

The communication device 215 is a communication interface that is configured, for example, as a communication device or the like to be connected to the communication network 12. The communication device 215 may also be a communication device that is compatible with a wireless local area network (LAN, a communication device that is compatible with Wireless USB, or a wired communication device that performs communication using a fixed line. The communication device 215 transmits and receives various types of data, such as the location information for the mobile device 20, a location alias, and the like, to and from other mobile devices 20 through the communication network 12.

1-3. Functions of the Mobile Device According to the First Embodiment

Figure 3:
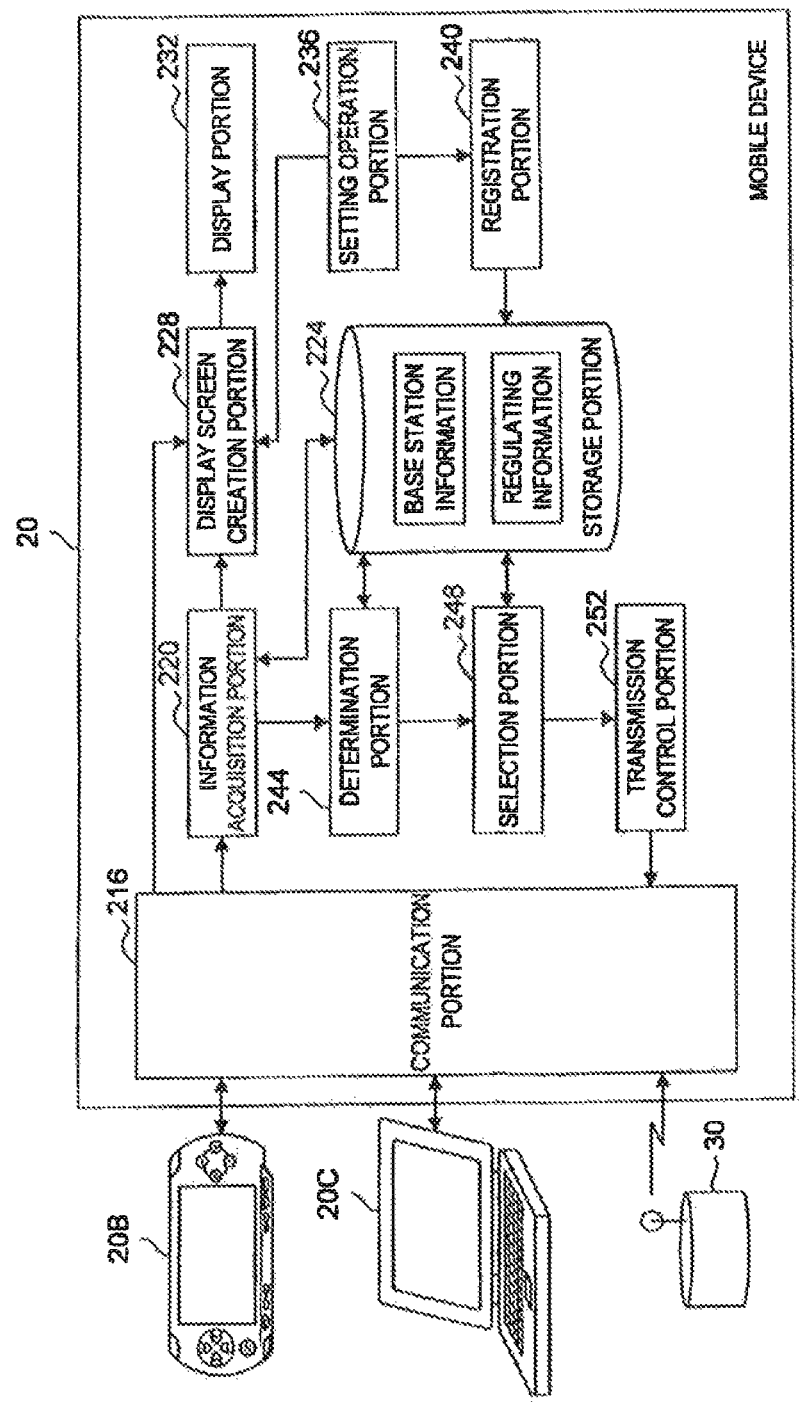
FIG. 3 is a block diagram that shows a functional configuration of the mobile device according to the first embodiment.

FIG. 3 is a block diagram that shows a functional configuration of the mobile device 20 according to the present embodiment. The mobile device 20 includes a communication portion 216, an information acquisition portion 220, a storage portion 224, a display screen creation portion 228, a display portion 232, a setting operation portion 236, a registration portion 240, a determination portion 244, a selection portion 248, and a transmission control portion 252. A method estimating the location of the mobile device 20 based on the functions of the communication portion 216, the information acquisition portion 220, and the storage portion 224 will be explained below. Registration of the regulating information based on the functions of the display screen creation portion 228, the display portion 232, and the setting operation portion 236 will also be explained below. Information transmission control based on the functions of the determination portion 244, the selection portion 248, and the transmission control portion 252 will also be explained below. An example of a display of the location information for another party based on the functions of the display screen creation portion 228 and the display portion 232 will also be explained below.

1-3-1. Method of Estimating Location of the Mobile Device

The communication portion 216 is an interface that transmits and receives information such as the location information, the location aliases, and the like to and from the mobile device 20B and the mobile device 20C. The communication portion 216 functions as a transmission portion, a receiving portion, and a transmission device. The communication portion 216 can also receive a signal that is transmitted from a base station 30.

The base station 30 may be a base station in an IEEE 802.11 series (for example, 802.11b, 802.11g, or the like) wireless local area network (LAN) that is based on the Wireless Fidelity (Wi-Fi) standards. The base station 30 may also be a base station in the Global System for Mobile Communications. The base station 30 may also be a base station for a mobile telephone or a PHS. The base station 30 may also be a short-range wireless base station such as Bluetooth or the like. The base station 30 may also be a Global Positioning System (GPS) satellite.

For example, in a case where the base station 30 is a Wi-Fi base station (access point), the base station 30, in addition to any signals that it transmits when it relays wireless communications, can transmit at regular intervals a beacon signal that announces its presence to the surrounding area. The beacon signal may include, for example, a base station ID as base station identifying information that is uniquely assigned to the base station 30. The result is that the mobile device 20 can recognize the presence of the base station 30 that is present in its vicinity based on the base station ID in the beacon signal that is received by the communication portion 216.

The information acquisition portion 220 measures the received signal strength of the signal that the communication portion 216 receives from each base station 30 in the vicinity. Based on the received signal strength that it measures for each base station 30, the information acquisition portion 220 acquires the location information that indicates the current location of the mobile device 20. The received signal strength that the information acquisition portion 220 measures will be explained with reference to FIGS. 4 and 5.

Figure 4:
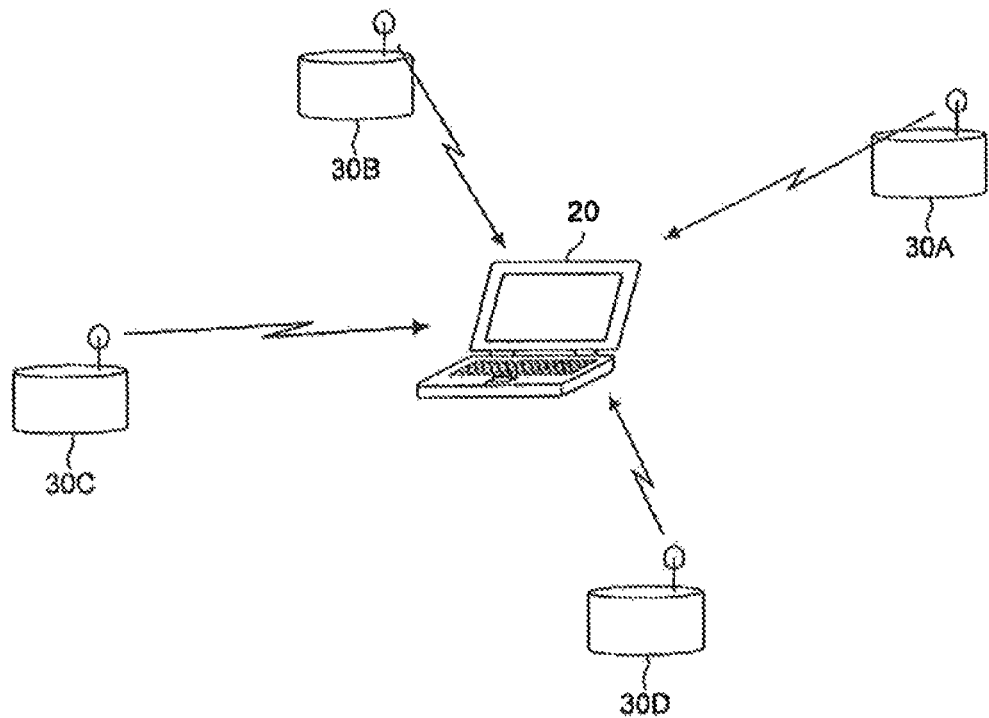
FIG. 4 is an explanatory figure that shows examples of location relationships between the mobile device and base stations according to the first embodiment.

FIG. 4 is an explanatory figure that shows examples of location relationships between the mobile device 20 and the base stations 30. FIG. 5 is an explanatory figure that shows examples of the signal strengths that are measured by the information acquisition portion 220. In the examples in FIG. 4, a base station 30A, a base station 30B, a base station 30C, and a base station 30D are disposed in the vicinity of the mobile device 20. The communication portion 216 of the mobile device 20 can receive the signals that are transmitted from the base station 30A, the base station 30B, the base station 30C, and the base station 30D. Note that in this specification, for ease of explanation, the reference numeral that is assigned to each base station is used as the base station ID for that base station.

As shown in FIG. 5, the information acquisition portion 220 measures the received signal strength of the signal that is transmitted from each base station 30 and received by the communication portion 216. FIG. 5 illustrates a case in which the received signal strength of the signal that is transmitted from the base station 30A, for which the base station ID is 30A, is −90 Dbm, the received signal strength of the signal that is transmitted from the base station 30B, for which the base station ID is 30B, is −70 Dbm, the received signal strength of the signal that is transmitted from the base station 30C, for which the base station ID is 30C, is −80 Dbm, and the received signal strength of the signal that is transmitted from the base station 30D, for which the base station ID is 30D, is −75 Dbm.

For its part, the storage portion 224 stores, as the base station information, the base station IDs of the base stations 30 that are performing wireless communications with the mobile device 20 and the location information that indicates the sites where the base stations 30 are installed. Examples of the base station information that is stored in the storage portion 224 will be explained with reference to FIG. 6.

FIG. 6 is an explanatory figure that shows examples of the base station information that is stored in the storage portion 224. As shown in FIG. 6, the storage portion 224 stores, as information on the known base stations, the base station IDs, as well as latitudes and longitudes as the location information for the sites where the base stations 30 are installed. Specifically, the storage portion 224 stores information indicating that the base station 30A, for which the base station ID is 30A, is installed at (east) longitude 135.001 and (north) latitude 35.49.

In the same manner, the storage portion 224 stores information indicating that the base station 30B, for which the base station ID is 30B, is installed at longitude 135.002 and latitude 35.41, that the base station 30C, for which the base station ID is 30C, is installed at longitude 135.003 and latitude 35.50, and that the base station 30D, for which the base station ID is 30D, is installed at longitude 135.002 and latitude 35.42.

Note that the form in which the location information is stored in the storage portion 224 is not limited to the latitude and the longitude. For example, the location information may also be in the form of x, y coordinates, polar coordinates, or vectors.

The storage portion 224 may be configured from a storage medium such as a non-volatile memory such as an electrically erasable programmable read-only memory (EEPROM), an erasable programmable read-only memory (EPROM), or the like, a magnetic disk such as a hard disk, a disk type magnetic medium, or the like, an optical disc such as a compact disc recordable (CD-R), a compact disc rewritable (CD-RW), a digital versatile disc recordable (DVD-R), a digital versatile disc rewritable (DVD-RW), a dual-layer digital versatile disc recordable (DVD+R), a dual-layer digital versatile disc rewritable (DVD+RW), a digital versatile disc random access memory (DVD-RAM), a Blu-ray™ disc recordable (BD-R), a dual-layer Blu-ray™ disc recordable (BD-RE), or the like, or a magneto-optical (MO) disk or the like.

Example of a Method for Estimating the Location Information

The information acquisition portion 220 uses the measured received signal strength of the signal that is transmitted from each base station 30 and the base station location information that is stored in the storage portion 224 to estimate and acquire the location information for the mobile device 20 based on Equation 1 below, for example.

$$O = \frac{1}{W} \cdot \sum_i (Wi \cdot Ai) \qquad \text{Equation 1}$$

$$Wi = \frac{1}{distS(O, Ai)} \qquad \text{Equation 2}$$

$$W = \sum_i Wi \qquad \text{Equation 3}$$

In Equation 1, Ai is the location information for the i-th base station 30 that is registered in the storage portion 224. Therefore, in a case where the base station information is expressed by the longitude and the latitude, as in FIG. 6, Equation 1 is used for each longitude and latitude pair. Wi, as shown in Equation 2, is a weighting factor that is obtained based on distS (O, Ai), which expresses the distance between the mobile device 20 and the i-th base station 30, as estimated from the signal strength. W, as shown in Equation 3, is the sum of the weighting factors.

Referring to Equation 1, the base station 30 location information for which distS (O, Ai) is small strongly influences the estimated location O of the mobile device 20 for each measured time. By contrast, the base station 30 location information for which distS (O, Ai) is large has little influence on the estimated location O of the mobile device 20.

By using Equation 1, the information acquisition portion 220 can reasonably estimate the location information for the mobile device 20. The information acquisition portion 220 can also acquire an address such as "AB Prefecture, C-ku, 5-chome" based on the estimated location information.

A Modification Example of the Location Information Estimation Method

Note that the method for estimating the location information for the mobile device 20 is not limited to the method that uses Formula 1. For example, the location of the mobile device 20 may also be estimated to be the location of the base station 30 that is the transmission source of the signal that has the highest received signal strength in the mobile device 20. The location of the mobile device 20 may also be estimated to be a location that is central among the base stations 30 that are the transmission sources of the signals whose received signal strengths in the mobile device 20 are at least a specified threshold value. The location of the mobile device 20 may also be estimated to be a location that is central among the base stations 30 that are the transmission sources of the signals whose received signal strengths in the mobile device 20 rank in a specified percentile, such as the top 10%, the top 20%, or the like.

The location of the mobile device 20 may also be estimated to be a location that is central among the base stations 30 that are the transmission sources of the signals whose received signal strengths in the mobile device 20 are of a specified rank, such as the top five, the top ten, or the like.

A case has been explained in which the information acquisition portion 220 estimates the location information for the mobile device 20 based on the received signal strength of the signal that is transmitted from the Wi-Fi base station 30. However, the information acquisition portion 220 may also acquire the location information for the mobile device 20 based on position measurement radio waves that are transmitted from a OPS satellite. The information acquisition portion 220 may also acquire the location information for the mobile device 20 based on a received signal strength of a signal that is transmitted from a base station for a mobile telephone or a PHS.

Further, a case has been explained in which the estimation and acquisition of the location information for the mobile device 20 are performed in the mobile device 20, but the present embodiment is not limited to this example. For example, the mobile device 20 may transmit the received signal strengths that the information acquisition portion 220 has measured for each of the base stations 30 to a location estimation server (not shown in the figures) that stores the base station information. In the location estimation server, the location information for the mobile device 20 may then be estimated based on the received signal strengths that are received from the mobile device 20 and on the stored base station information. The mobile device 20 may then receive the estimated location information from the location estimation server. In this configuration, the base station information does not need to be stored in the storage portion 224 of the mobile device 20, so the storage capacity of the storage portion 224 can be reduced.

1-3-2. Registration of Regulating Information

Next, a registration of regulating information that, in a case where the mobile device 20 is present at a specific location, regulates whether information that pertains to the specific location is transmitted to the communication portion 216 or not will be explained with reference to FIGS. 7 and 8.

Figures 7, 8:
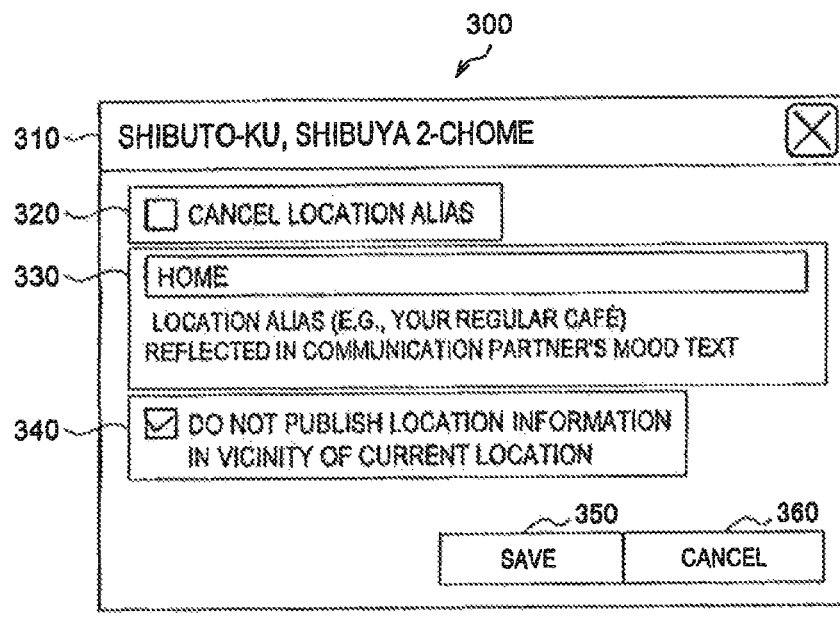
FIG. 7 is an explanatory figure that shows an example of a regulating information registration screen.
FIG. 8 is an explanatory figure that snows examples of the regulating information that is stored in the storage portion.

FIG. 7 is an explanatory figure that shows an example of a regulating information registration screen. FIG. 8 is an explanatory figure that shows examples of the regulating information that is stored in the storage portion 224. The display screen creation portion 228 creates a regulating information registration screen 300 as shown in FIG. 7, and the display portion 232 displays the registration screen 300. Specifically, the regulating information registration screen 300 includes an address display 310, which says, "Shibuto-ku, Shibuya 2-chome," an alias publication selection display 320, an alias setting display 330, a location publication selection display 340, a Save button 350, and a Cancel button 360.

The alias publication selection display 320 is a display for selecting whether or not to transmit to the communication portion 216 the location alias, which is information for transmission that expresses in a different form the location information "Shibuto-ku, Shibuya 2-chome" shown in the address display 310. The user of the mobile device 20 can operate the setting operation portion 236 to place a check in the check space (box) of the alias publication selection display 320 so that the location alias will not be transmitted. If the user of the mobile device 20 does not place a check in the check space of the alias publication selection display 320, the location alias will be transmitted.

The alias setting display 330 is a display for setting the location alias that expresses in a different form the location information "Shibuto-ku, Shibuya 2-chome" shown in the address display 310. The user of the mobile device 20 can operate the setting operation portion 236 to input the location alias in the alias setting display 330. The location alias may, for example, be information that indicates a location, such as "Home", "Company", "Café", or the like, or information that indicates a status for the user of the mobile device 20, such as "Going home", "In a meeting", "Free time", or the like.

The location publication selection display 340 is a display for selecting whether or not to transmit to the communication portion 216 the location information (for example, the latitude and longitude) for Shibuto-ku, Shibuya 2-chome in a case where the mobile device 20 is in the vicinity of Shibuto-ku, Shibuya 2-chome, as shown in the address display 310. The user of the mobile device 20 can operate the setting operation portion 236 to place a check in the check space (box) of the location publication selection display 340 so that the location information will not be transmitted. If the user of the mobile device 20 does not place a check in the check space of the location publication selection display 340, the location information will be transmitted. If the regulating information shown in FIG. 7 is registered, the location information will not be published in the vicinity of Shibuto-ku, Shibuya 2-chome, and "Home" will be published as the location alias.

The Save button 350 is a display for setting the regulating information to the content that is displayed on the regulating information registration screen 300. If the user of the mobile device 20 operates the setting operation portion 236 to select the Save button 350, the regulating information whose content is displayed on the regulating information registration screen 300 is stored in the storage portion 224 by the registration portion 240. The Cancel button 360 is a display for canceling the regulating information registration screen 300. If the user of the mobile device 20 operates the setting operation portion 236 to select the Cancel button 360, the display screen creation portion 228 stops creating the regulating information registration screen 300, and the regulating information registration screen 300 is purged from the display portion 232.

The registration portion 240 functions as a registration portion to store the regulating information in the storage portion 224, based on the user's operation on the regulating information registration screen 300. The storage portion 224 retains the regulating information that is stored in it by the registration portion 240. For example, the storage portion 224 stores and retains the regulating information in association with the location information as shown in FIG. 8.

Specifically, the regulating information that regulates such that the location information is not published and "Home" is published as the location alias is associated with the location information of latitude 35.6597 and longitude 139.7019. The regulating information regulates such that, in a case where the mobile device 20 is present at latitude 35.6597 and longitude 139.7019, the location information of latitude 35.6597 and longitude 139.7019 is not published and "Home" is published as the location alias. Note that the regulating information may also be effective within a specified range (for example, within a radius of 100 meters) from latitude 35.6597 and longitude 139.7019.

In the same manner, in the examples shown in FIG. 8, the regulating information that regulates such that the location information is published and "Company" is published as the location alias is associated with the location information of latitude 35.6259 and longitude 139.7304. The regulating information regulates such that, in a case where the mobile device 20 is present at latitude 35.6259 and longitude 139.7304, the location information of latitude 35.6259 and longitude 139.7304 is published and "Company" is published as the location alias. Note that the location information that is associated with the regulating information is not limited to the latitude and longitude, but may also be an address or a unique name such as a building name, a station name, or the like. Moreover, the location information that is associated with the regulating information may also be information that indicates a specified range on a map, rather than a specific point on a map.

1-3-3. Transmission Control Based on the Regulating Information

Next, a transmission control of information related to the current location of the mobile device 20 that is based on the regulating information that is stored in the storage portion 224 will be explained.

The determination portion 244 determines whether or not the regulating information that is associated with the location information for the mobile device 20 that was acquired by the information acquisition portion 220 is stored in the storage portion 224. For example, in the case where the location information for the mobile device 20 is the latitude 35.6259 and longitude 139.7304, the determination portion 244 determines whether or not the regulating information that is associated with the latitude 35.6259 and longitude 139.7304 is stored in the storage portion 224. Note that the determination portion 244 may also determine whether or not the regulating information that is associated with location information whose difference from the location information of the mobile device 20 is within a specified range is stored in the storage portion 224.

In a case where the determination portion 244 determines that the regulating information that is associated with the location information for the mobile device 20 that was acquired by the information acquisition portion 220 is stored in the storage portion 224, the selection portion 248 selects from the storage portion 224 the regulating information that is associated with the location information for the mobile device 20.

The transmission control portion 252, based on the regulating information that was selected by the selection portion 248, controls transmission from the communication portion 216 of information that corresponds to the location of the mobile device 20. Specifically, in a case where the regulating information that was selected by the selection portion 248 includes a regulation that prohibits the publication of the location information, the transmission control portion 252 does not transmit the location information for the mobile device 20 to the communication portion 216. In a case where the regulating information that was selected by the selection portion 248 includes the location alias, the transmission control portion 252 transmits to the communication portion 216 the location alias that is included in the regulating information. The destination for the transmission of the location information and the location alias from the communication portion 216 may be a wireless communication device such as the mobile device 20B, the mobile device 20C, or the like that is registered in advance in a group.

In a case where the determination portion 244 determines that the regulating information that is associated with the location information for the mobile device 20 that was acquired by the information acquisition portion 220 is not stored in the storage portion 224, and the regulating information that is associated with the location information for the mobile device 20 is not selected from the storage portion 224 by the selection portion 248, the transmission control portion 252 may either transmit or not transmit the location information for the mobile device 20 to the communication portion 216. As can be understood from the above explanation, the information that corresponds to the location of the mobile device 20 includes the location information for the mobile device 20 and the location alias that is included in the regulating information.

Therefore, there will be cases where the transmission control portion 252 transmits to the communication portion 216 only the location information for the mobile device 20, cases where the transmission control portion 252 transmits to the communication portion 216 only the location alias for the mobile device 20, cases where the transmission control portion 252 transmits to the communication portion 216 both the location information and the location alias for the mobile device 20, and cases where the transmission control portion 252 transmits to the communication portion 216 neither the location information nor the location alias for the mobile device 20.

Note that the regulating information may include effective period information that indicates an effective period for the regulating information, and the selection portion 248 may select from the storage portion 224 the regulating information that is associated with the location information acquired by the information acquisition portion 220 and that is within the effective period. This is because there may be cases where the user of the mobile device 20 does not want to publish to third parties during a specific time period in a specific location. For example, the user of the mobile device 20 may want to publish to third parties when at work on a weekday, but not want to publish to third parties when at work on a holiday.

In this sort of case, if the user includes in the regulating information effective period information indicating a holiday to the effect that the transmission of the location information is prohibited in the workplace, the transmission control portion 252 can prohibit the transmission of the location information when the mobile device 20 is present in the workplace of the user of the mobile device 20 on the holiday. That is, the user can control whether or not to publish the location information of the mobile device 20 according to the location of the mobile device 20 and the current time. This makes it possible to further enhance the protection of information pertaining to the current location of the mobile device 20, that is, the current location of the user of the mobile device 20.

1-3-4. Examples of Other Parties' Location Information Displayed on the Mobile Device Next, examples of displays on the mobile device 20 of information pertaining to the current locations of the mobile device 20B, the mobile device 20C, and the like will be explained with reference to FIGS. 9 and 10.

FIG. 9 is an explanatory figure that shows an example of a display of information related to the current locations of the mobile device 20B, the mobile device 20C, and the like. A location display screen 400, shown in FIG. 9, includes a current location display 410 and user location displays 420 to 490. Note that the location display screen 400 is created by the display screen creation portion 228 and displayed by the display portion 232. Note also that for ease of explanation, the reference numeral 21 will be assigned to the other mobile devices.

The user location display 420 indicates that the mobile device 21 that is used by a user called "Five" is in a location shown by the location information "Shibuto-ku, Sakuaoka-cho" and that the location is 284 meters from the mobile device 20. Note that the icon in the leftmost part of the user location display 420 indicates that the mobile device 21 that is used by the user called "five" is in an online state.

The user location display 430 indicates that the mobile device 21 that is used by a user called "Taro" is in a location shown by the location information "Kohoku-ku, Minami-Aoyama 5-chome" and that the location is 1.1 kilometers from the mobile device 20. Note that the icon in the leftmost part of the user location display 430 indicates that the mobile device 21 that is used by the user called "Taro" is in an offline state.

The user location display 440 indicates that a user called "Smile" is at "Lunch" and that the mobile device 21 that is used by the user called "Smile" is in a location that is 2.7 kilometers from the mobile device 20. Note that in a case where only the location alias is received from the mobile device 21, and the location information is not received, the display of the distance between the mobile device 21 and the mobile device 20 may be omitted.

The user location display 450 indicates that a user called "Buli" is at "Company" and that the mobile device 21 that is used by the user called "Bull" is in a location that is 4.4 kilometers from the mobile device 20. Note that the icon in the leftmost part of the user location display 450 indicates that although the mobile device 21 that is used by the user called "Buli" is in an online state, a specified period is not in effect.

In the same manner, the user location display 460 indicates that a user called "Peco" is at "Godaiba" and that the mobile device 21 that is used by the user called "Peco" is in a location that is 8 kilometers from the mobile device 20. The user location display 470 indicates that a user called "Kuro" is at "Business trip" and that the mobile device 21 that is used by the user called "Kuro" is in a location that is 366 kilometers from the mobile device 20.

The user location display 480 and the user location display 490 include neither the location information nor the location aliases. Therefore, the information pertaining to the current locations of the mobile device 21 that is used by the user called "Seven" and the mobile device 21 that is used by the user called "Shiro" is not known.

Thus the display portion 232 can display the user location displays for other users, sorted according to the distance between the mobile device 21 and the mobile device 20. Moreover, the display portion 232 can display the locations of the other users superimposed on a map screen, as shown in FIG. 10.

Figure 10:
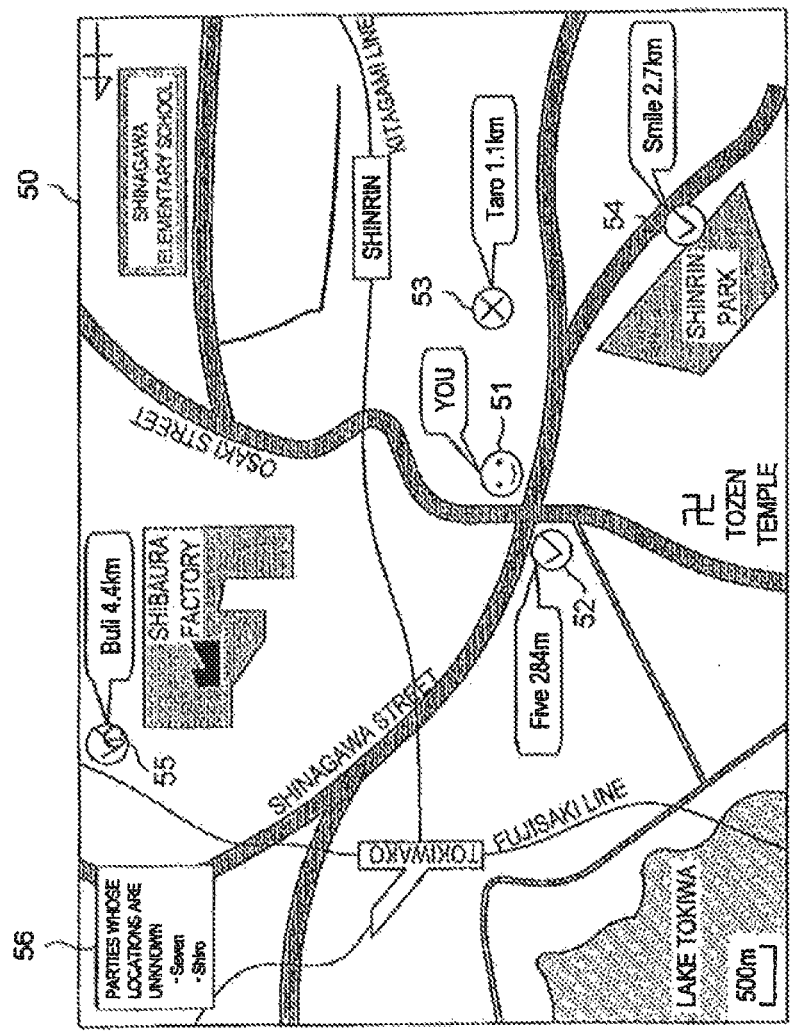
FIG. 10 is an explanatory figure that shows another example of a display of information related to the current locations of other mobile devices.

FIG. 10 is an explanatory figure that shows another example of a display of information related to the current locations of the mobile devices 21. Based on the location information for the mobile devices 21 that is received through the communication portion 216, the display screen creation portion 228 can create a location display screen 50, as shown in FIG. 10, on which user location displays 52 to 55, which show the locations of the mobile devices 21, are superimposed on a map screen. The display portion 232 can display the location display screen 50.

In addition, a user location display 56 displays the users of the mobile devices 21 from which the communication portion 216 has not received the location information. Specifically, in FIG. 10, the user location display 56 indicates that the location information is not known for the mobile devices 21 that are used by the user called "Seven" and the user called "Shiro".

1-4. Operation of the Mobile Device According to the First Embodiment

Next, a wireless communication method that is executed by the mobile device 20 according to the present embodiment will be explained with reference to FIG. 11.

Figure 11:
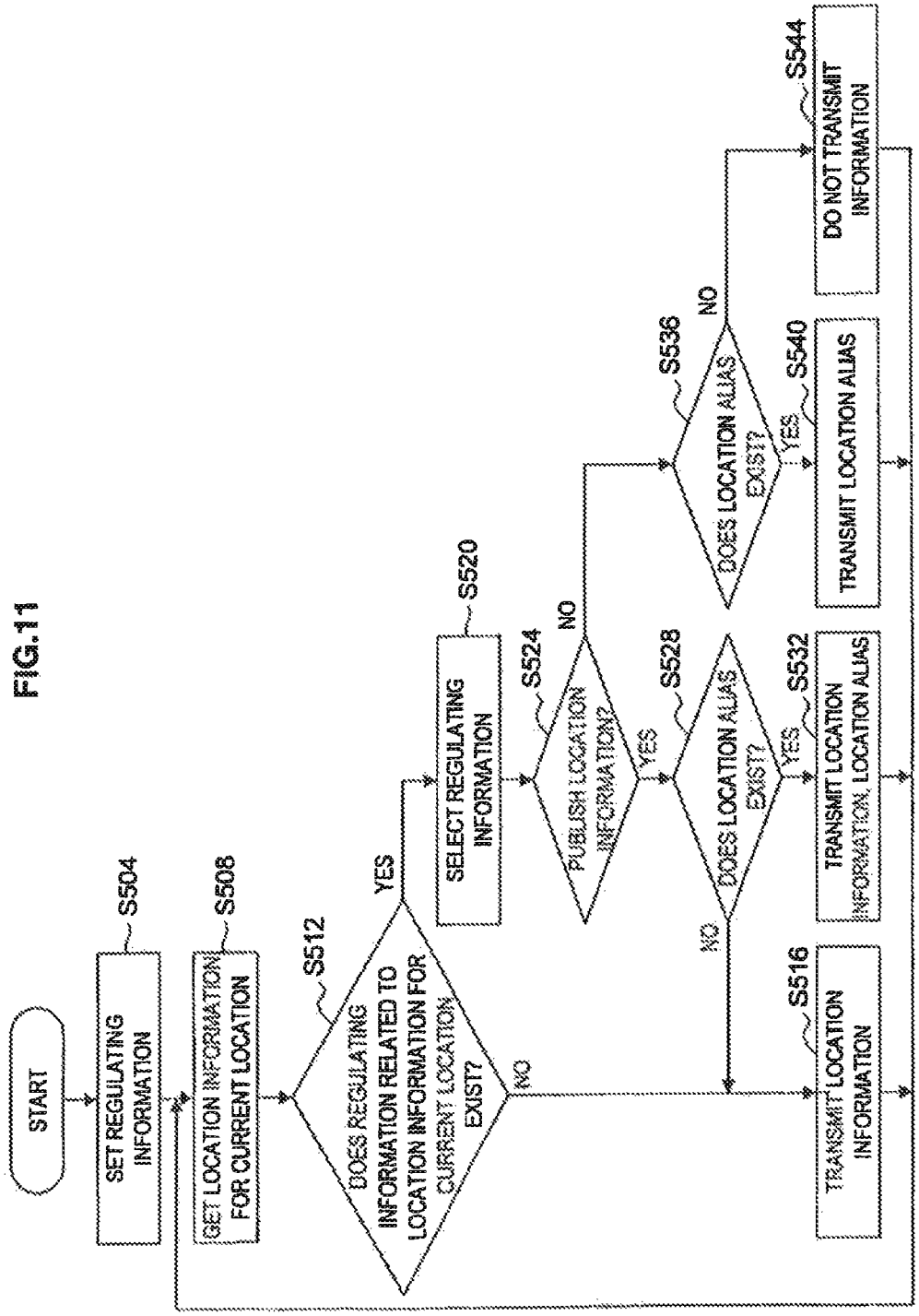
FIG. 11 is a flowchart that shows a flow of a wireless communication method that is executed by the mobile device according to the first embodiment.

FIG. 11 is a flowchart that shows a flow of the wireless communication method that is executed by the mobile device 20 according to the present embodiment. First, the registration portion 240 of the mobile device 20 stores the regulating information in the storage portion 224 based on the user's operation of the setting operation portion 236 (step S5041. In other words, the registration portion 240 sets the regulating information based on the user's operation of the setting operation portion 236.

Next, the information acquisition portion 220 acquires the location information that indicates the current location of the mobile device 20 (step S508). Then the determination portion 244 determines whether or not the regulating information that is associated with the location information for the mobile device 20 is stored in the storage portion 224 (step S5121. If the determination portion 244 determines that the regulating information that is associated with the location information for the mobile device 20 is not stored in the storage portion 224, the transmission control portion 252 transmits the location information for the mobile device 20 to the communication portion 216 (step S516).

If it is determined at step S512 that the regulating information that is associated with the location information for the mobile device 20 is stored in the storage portion 224, the selection portion 248 selects from the storage portion 224 the regulating information that is associated with the location information for the mobile device 20 (step S520). Then, based on the selected regulating information, the transmission control portion 252 determines whether or not the location information for the mobile device 20 will be published (step S524). In a case where the transmission control portion 252 has determined that the location information will be published, the transmission control portion 252 determines whether or not the location alias is included in the selected regulating information (step S528). It the transmission control portion 252 determines that the location alias is not included in the selected regulating information, the processing proceeds to step S516, and the transmission control portion 252 transmits only the location information to the communication portion 216.

On the other hand, if the transmission control portion 252 determines that the location alias is included in the selected regulating information, the transmission control portion 252 transmits to the communication portion 216 both the location information for the mobile device 20 and the location alias that is included in the regulating information (step S532).

In a case where the transmission control portion 252 determines at step S524 that the location information for the mobile device 20 will not be published, the transmission control portion 252 determines whether or not the location alias is included in the selected regulating information (step S536). If the transmission control portion 252 determines that the location alias is included in the selected regulating information, the transmission control portion 252 transmits to the communication portion 216 the location alias that is included in the selected regulating information (step S540). On the other hand, if the transmission control portion 252 determines that the location alias is not included in the selected regulating information, the transmission control portion 252 prohibits the transmission of the location information and the location alias to the communication portion 216 (step S544).

FIGS. 12A-12D are explanatory figures that show specific examples of the information that is transmitted from the communication portion 216. In a case where the processing at step S516 in FIG. 11 is performed, that is, in a case where the transmission control portion 252 transmits only the location information to the communication portion 216, the communication portion 216 transmits only the location information, for example, "Shibuto-ku, Shibuya 2-chome Latitude 35.6597 Longitude 139.7019", as shown in FIG. 12A.

In a case where the processing at step S532 in FIG. 11 is performed, that is, in a case where the transmission control portion 252 transmits both the location information and the location alias to the communication portion 216, the communication portion 216 transmits both the location information and the location alias, for example, the location alias "Home" and the location information "Shibuto-ku, Shibuya 2-chome Latitude 35.6597 Longitude 139.7019", as shown in FIG. 12B.

In a case where the processing at step S540 in FIG. 11 is performed, that is, in a case where the transmission control portion 252 transmits only the location alias to the communication portion 216, the communication portion 216 transmits only the location alias, for example, "Home", as shown in FIG. 12C. Further, in a case where the processing at step S544 in FIG. 11 is performed, that is, in a case where the transmission control portion 252 prohibits the transmission of both the location information and the location alias to the communication portion 216, the communication portion 216 transmits neither the location information nor the location alias, as shown in FIG. 12D.

As explained above, in the mobile device 20 according to the first embodiment of the present invention, the information acquisition portion 220 acquires the location information that indicates the location of the mobile device 20. Further, the regulating information that regulates the information published by the communication portion 216 that corresponds to the location of the mobile device 20 is stored in the storage portion 224 in association with the location information. The selection portion 248 selects from the storage portion 224 the regulating information that is associated with the location information for the mobile device 20, and in accordance with the selected regulating information, the transmission control portion 252 controls the transmission from the communication portion 216 of the information that corresponds to the location of the mobile device 2U. That is, the mobile device 20, based on its own location, can control the transmission of the information that corresponds to its own location.

Additionally, the regulating information can include information that regulates whether or not the location information for the mobile device 20 is transmitted to the communication portion 216. The transmission control portion 252, in accordance with the regulating information selected by the selection portion 248, can control whether or not the location information for the mobile device 20 is transmitted from the communication portion 216. Therefore, the mobile device 20 can control whether or not its own location information is transmitted, according to its current location, that is, according to the current location of the user of the mobile device 20. This makes it possible to enhance the protection of the information that pertains to the current location of the mobile device 20 and of the user of the mobile device 20.

The regulating information can also include the location alias, which expresses, in a different form, the associated location information in the storage portion 224. The transmission control portion 252 can transmit to the communication portion 216 the location alias that is included in the regulating information that is selected by the selection portion 248. Therefore, if the transmission control portion 252 transmits the location alias to the communication portion 216 based on the regulating information, it is possible to publish the information that corresponds to the location of the mobile device 20 without publishing the location information itself to third parties.

1-5. Modification Examples of the First Embodiment

Note that in the explanation above, the information that indicates the location of the mobile device 20 was used as an example of the location information, but the location information is not limited to that example. That is, the information that the information acquisition portion 220 acquires, and the information that is stored in the storage portion 224 in association with the regulating information, is not limited to the information that indicates the location. For example, the location information may also be information that is uniquely obtainable at a certain location. That is, the information acquisition portion 220 may also acquire information that is uniquely obtainable at the location of the mobile device 20, and the selection portion 248 may select from the storage portion 224 the regulating information that corresponds to the information that is uniquely obtainable at the location of the mobile device 20. This will be explained in detail below with reference to FIGS. 13 and 14.

The signal strength pattern (wireless context) of the signals that the mobile device 20 receives in a given location from a plurality of the base stations 30 is a wireless context that is unique to that location. Cases where the same wireless context can be acquired in another location are rare. Therefore, the location of the mobile device 20 can be almost uniquely estimated by acquiring the wireless context of the mobile device 20. This modification example is proposed based on a situation in which a unique wireless context is obtainable in a given location.

In this modification example, the wireless contexts shown in FIG. 13, for example, are stored in advance in the storage portion 224 in association with the regulating information that includes the location aliases.

FIG. 13 is an explanatory figure that shows an example of the regulating information that is stored in the storage portion 224. As shown in FIG. 13, the location aliases, such as "Home", "Company", and the like, are each associated with a set of the received signal strengths for the base stations 30, each set serving as the wireless context for the associated location alias. Specifically, the location alias "Home" is associated with the wireless context in which the received signal strength of the signal that is transmitted from the base station 30A, for which the base station ID is 30A, is −90 Dbm, the received signal strength of the signal that is transmitted from the base station 30B, for which the base station ID is 30B, is −70 Dbm, the received signal strength of the signal that is transmitted from the base station 30C, for which the base station ID is 30C, is −80 Dbm, and the received signal strength of the signal that is transmitted from the base station 30D, for which the base station ID is 30D, is −75 Dbm. In the same manner, the location aliases "Company" and "Meeting place" are also each associated with a wireless context that includes a plurality of combinations of the base station IDs and the received signal strengths.

The Information acquisition portion 220 measures the received signal strength of the signal that is transmitted from each of the base stations 30 in the vicinity. The information acquisition portion 220 then acquires the wireless context for the mobile device 20, which includes the combinations of the base station IDs and the received signal strengths.

The determination portion 244 determines whether or not the regulating information that is associated with a wireless context that matches or resembles the wireless context of the mobile device 20 that the information acquisition portion 220 acquired is stored in the storage portion 224. The selection portion 248 selects from the storage portion 224 the regulating information that is associated with the wireless context that matches or resembles the wireless context of the mobile device 20.

Examples of this technique are provided here, using a case in which a determination is made of a resemblance between a wireless context A and a wireless context B.

(1) In a case where the base station IDs included in the wireless context A and the base station IDs included in the wireless context B match by at least a specified degree of resemblance, the wireless context A and the wireless context B are determined to match or resemble one another. In a case where the base station IDs included in the wireless context A and the base station IDs included in the wireless context B do not match by at least a specified degree of resemblance, the wireless context A and the wireless context B are determined not to match or resemble one another.

(2) In a case where at least a specified number of the base station IDs included in the wireless context A for which the received signal strengths are at least a specified value match the base station IDs included in the wireless context B for which the received signal strengths are at least the specified value, the wireless context A and the wireless context B are determined to match or resemble one another. In a case where the specified number of the base station IDs included in the wireless context A for which the received signal strengths are at least a specified value do not match the base station IDs included in the wireless context B for which the received signal strengths are at least the specified value, the wireless context A and the wireless context B are determined not to match or resemble one another.

(3) The correlation between the aggregates of the base station IDs and the received signal strengths in the wireless context A and the wireless context B is computed as a coefficient. If the correlation coefficient is at least a set value, the wireless context A and the wireless context B are determined to match or resemble one another. If the correlation coefficient is not at least the set value, the wireless context A and the wireless context B are determined not to match or resemble one another.

(4) The determination of the resemblance between the wireless context A and the wireless context B can also be made using any other techniques and any other standards that are desired.

The transmission control portion 252 transmits to the communication portion 216 the location alias that is included in the regulating information selected by the selection portion 248. Therefore, for example, if the regulating information that includes the location alias "Home" is stored in the storage portion 224 in association with the wireless context for "Home", then when the mobile device 20 is at "Home", the information acquisition portion 220 can acquire the wireless context at "Home", the selection portion 248 can select from the storage portion 224 the regulating information that includes the location alias "Home", and the transmission control portion 252 can transmit the location alias "Home" to the communication portion 216.

In this configuration, the process of estimating the location of the mobile device 20 based on the received signal strengths of the signals that the mobile device 20 receives from each of the base stations 30 in the vicinity is unnecessary. Therefore, the need to store the base station information in the mobile device 20 for each of the base stations 30 and the need to query the location estimation server that estimates the location of the mobile device 20 are eliminated. It thus becomes possible to scale back the hardware and reduce the processing load of the mobile device 20.

Figure 14:
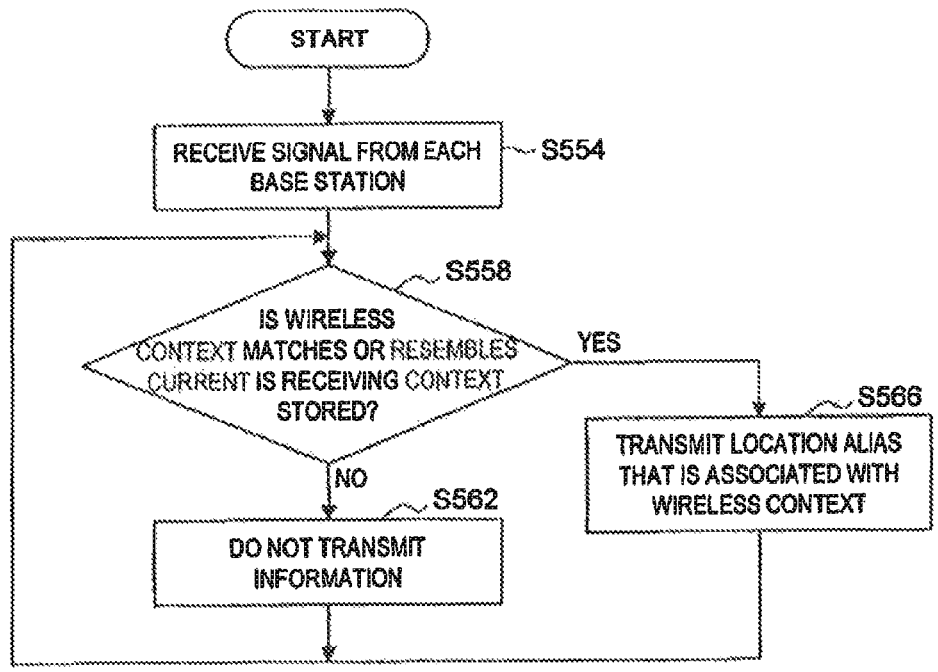
FIG. 14 is a flowchart that shows a flow of the modification example of the first embodiment.

FIG. 14 is a flowchart that shows a flow of the modification example of the present embodiment. First, the communication portion 216 receives the signal that is transmitted from each of the base stations in the vicinity (step S554).

Then the information acquisition portion 220 acquires the wireless context for the mobile device 20 based on the signals that the communication portion 216 receives. Next, the determination portion 244 determines whether or not a wireless context that matches or resembles the wireless context for the mobile device 20 is stored in the storage portion 224 (step S558).

If it is determined that a wireless context that matches or resembles the wireless context for the mobile device 20 is not stored in the storage portion 224, the transmission control portion 252 does not transmit to the communication portion 216 the information pertaining to the location of the mobile device 20 (step S562). On the other hand, if it is determined that a wireless context that matches or resembles the wireless context for the mobile device 20 is stored in the storage portion 224, the transmission control portion 252 transmits to the communication portion 216 the location alias that is included in the regulating information that is associated with the wireless context that matches or resembles the wireless context for the mobile device 20.

Note that not every structure in the mobile device 20 that is shown in FIG. 3 is necessarily required to be installed in the same device, and the structures may be installed separately in a plurality of devices. For example, the device in which the information acquisition portion 220 is installed may be separate from the device in which the storage portion 224, the determination portion 244, the selection portion 248, and the transmission control portion 252 are installed.

2. DESCRIPTION OF A SECOND EMBODIMENT OF THE PRESENT INVENTION

Next, a second embodiment of the present invention will be explained. Specifically, the purpose of the second embodiment of the present invention, as well as a function and an operation of a control server according to the second embodiment of the present invention, will be explained with reference to FIGS. 15 to 20.

2-1. Purpose of the Second Embodiment

According to the first embodiment, the determination of whether or not the location information for the mobile device 20 is published can be controlled according to the current location of the mobile device 20, that is, the current location of the user of the mobile device 20. However, there are many cases where, for example, even if the location information for the mobile device 20 is published to another mobile device 21 in a location several hundred kilometers away from the mobile device 20, the mobile device 21 cannot make effective use of the location information for the mobile device 20.

Accordingly, the second embodiment of the present invention was created to address this sort of situation. A control server 40 according to the second embodiment of the present invention can control whether or not the location information for the mobile device 20 is transmitted to the mobile device 21 according to the distance between the mobile device 20 and the mobile device 21. The control server 40 will be explained in detail below as an example of an information processing device.

2-2. Control Server Functions According to the Second Embodiment

Figure 15:
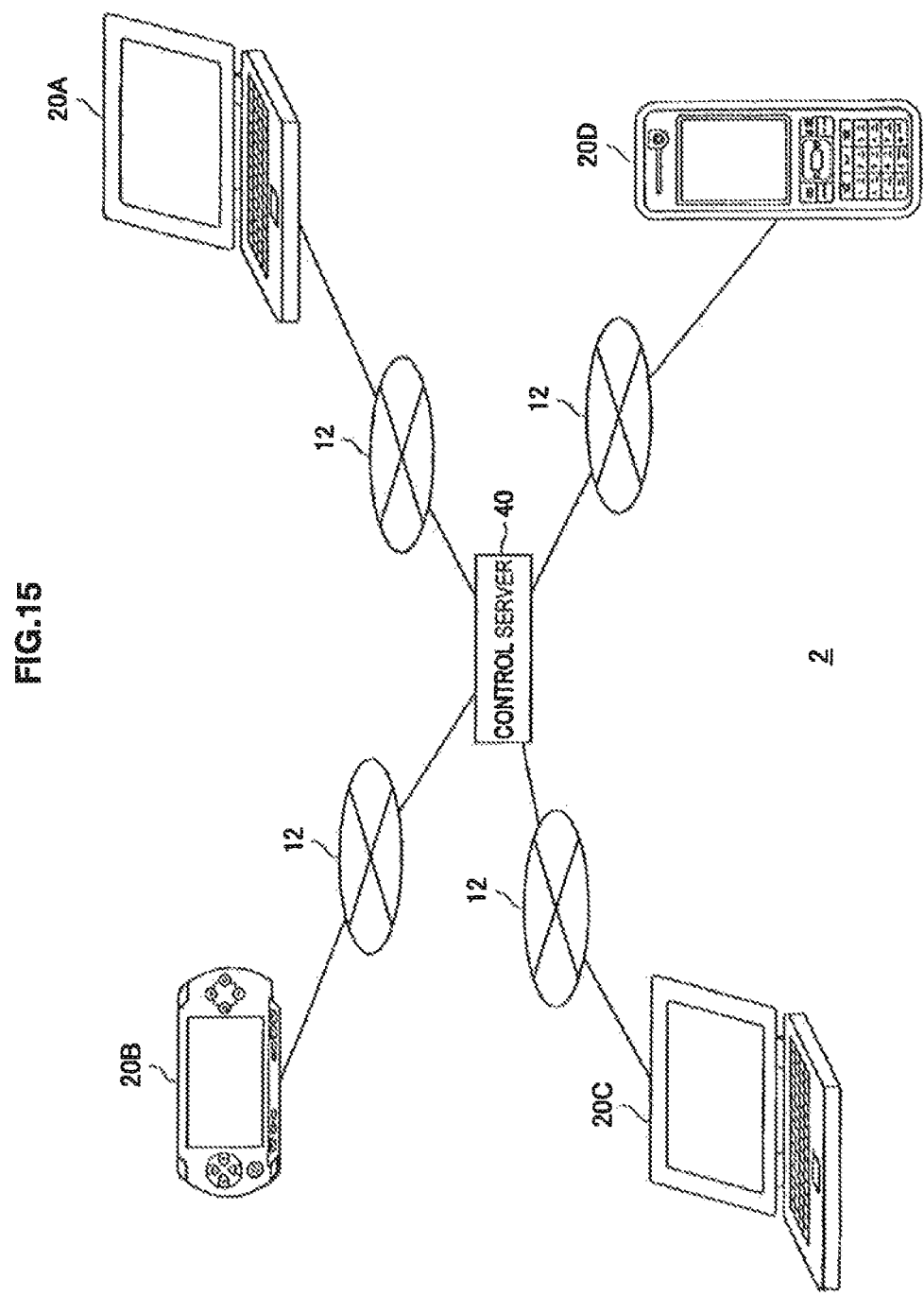
FIG. 15 is an explanatory figure that shows an example of a configuration of a wireless communication system according to a second embodiment of the present invention.

FIG. 15 is an explanatory figure that shows an example of a configuration of a wireless communication system 2 according to the second embodiment of the present invention. As shown in FIG. 15, in the present embodiment, all of the mobile devices 20 are connected through the control server 40.

Figure 16:
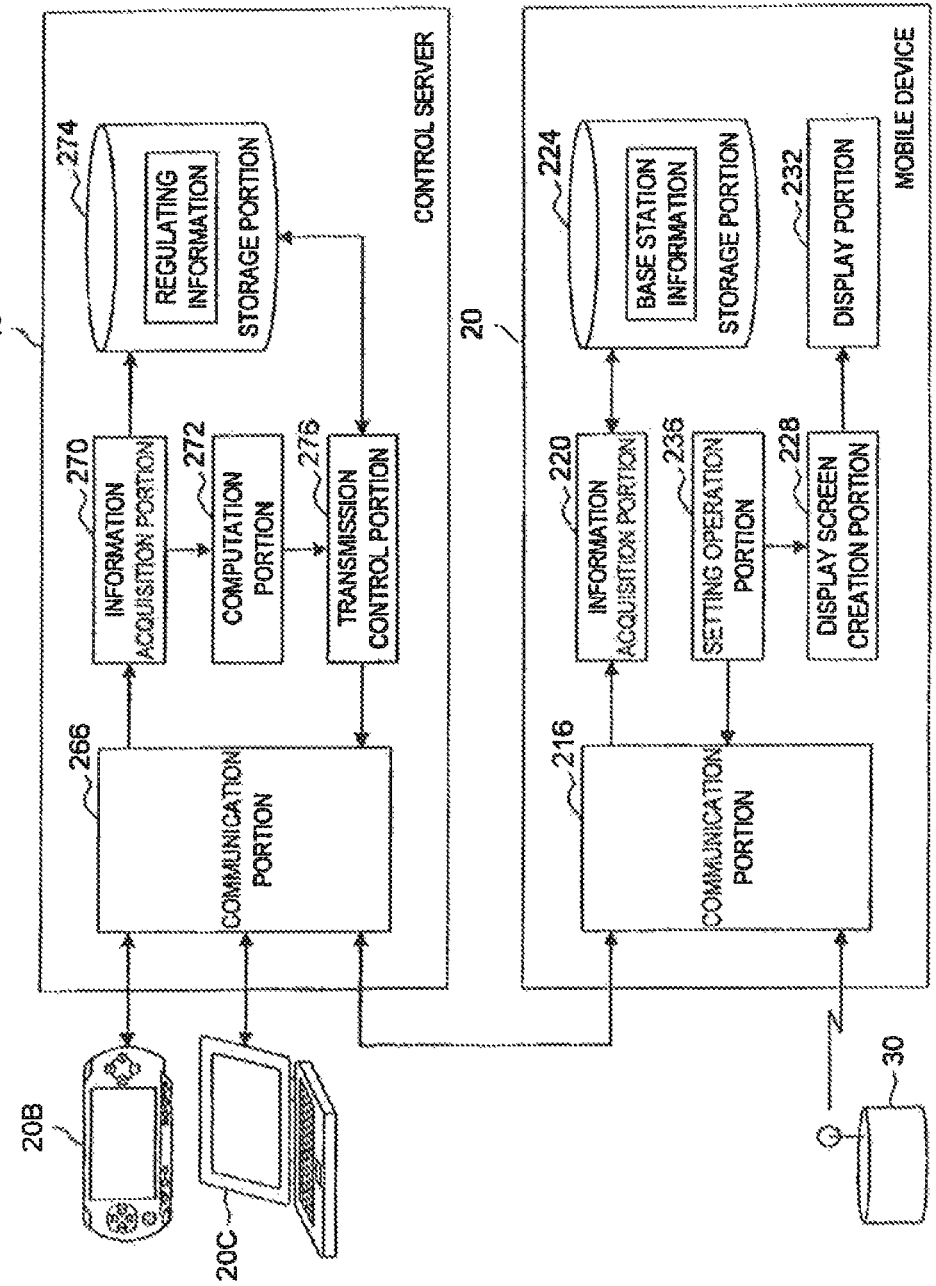
FIG. 16 is a block diagram that shows a functional configuration of a mobile device and a control server according to the second embodiment.

FIG. 16 is a block diagram that shows a functional configuration of the mobile devices 20 and the control server 40 according to the present embodiment. The mobile device 20 includes a communication portion 216, an information acquisition portion 220, a storage portion 224, a display screen creation portion 228, a display portion 232, and a setting operation portion 236. The control server 40, as the example of the information processing device, includes a communication portion 266, an information acquisition portion 270, a computation portion 272, a storage portion 274, and a transmission control portion 276.

If the distance between the mobile device 20 and the mobile device 21 exceeds a specified threshold value, the control server 40 does not transmit the location information for the mobile device 20 to the mobile device 21. If the distance between the mobile device 20 and the mobile device 21 does not exceed the specified threshold value, the control server 40 transmits the location information for the mobile device 20 to the mobile device 21. The mobile device 20 can set the specified threshold value. A method of setting the specified threshold value in the mobile device 20 will be explained with reference to FIG. 17.

FIG. 17 is an explanatory figure that shows an example of a regulating information registration screen 600. The regulating information registration screen 600 is a screen that is created by the display screen creation portion 228 and displayed by the display portion 232. In the example shown in FIG. 17, the regulating information registration screen 600 includes an address display 610, which says, "Shibuto-ku, Shibuya 2-chome," an alias publication selection display 620, an alias setting display 630, a publication range setting display 640, a Save button 650, and a Cancel button 660. The address display 610, the alias publication selection display 620, and the alias setting display 630 are substantially the same as the address display 310, the alias publication selection display 320, and the alias setting display 330 that were explained with reference to FIG. 7, so the explanation of these parts is omitted.

The publication range setting display 640 includes a publication selection display 642 and a range setting display 644. The publication selection display 642 is a display for selecting whether or not to publish the location information for the mobile device 20. In the example shown in FIG. 17, the publication selection display 642 has been checked, indicating that the publication of the location information for the mobile device 20 has been selected.

The range setting display 644 is a display for setting a range within which the location information for the mobile device 20 will be published to the other mobile devices 21 in a case where the publication of the location information for the mobile device 20 has been selected in the publication selection display 642. In the example shown in FIG. 17, the location information will be published from the mobile device 20 to the other mobile devices 21 that are within the range of the distance that is set in the range setting display 644. In other words, the control server 40 publishes the location information for the mobile device 20 to the mobile devices 21 whose distances from the mobile device 20 are within the specified threshold value, and the range setting display 644 is the display for setting the specified threshold value.

The Save button 650 is a display for setting the regulating information to the content that is displayed on the regulating information registration screen 600. If the user of the mobile device 20 operates the setting operation portion 236 to select the Save button 650, the regulating information whose content is displayed on the regulating information registration screen 600 is transmitted to the control server 40 by the communication portion 216. The control server 40 then stores in the storage portion 274 the regulating information that was received from the mobile device 20. The Cancel button 660 is a display for canceling the regulating information registration screen 600. If the user of the mobile device 20 operates the setting operation portion 236 to select the Cancel button 660, the display screen creation portion 228 stops creating the regulating information registration screen 600, and the regulating information registration screen 600 is purged from the display portion 232.

The storage portion 274 of the control server 40 stores the regulating information that was received from the mobile device 20, as shown in FIG. 18.

FIG. 18 is an explanatory figure that shows an example of the regulating information that is stored in the storage portion 274 of the control server 40. As shown in FIG. 18, the control server 40 stores a location information publication range in association with a device ID that identifies the mobile device 20 and a reference location.

In the example shown in FIG. 18, in the case of the mobile device 20 with the device ID "1", which is located at latitude 35.0012 and longitude 135.012, the regulating information indicates that the location information for the mobile device 20 will be published to the mobile devices 21 that are within a distance of 500 meters from the mobile device 20. In the case of the mobile device 20 with the device ID "2", which is located at latitude 35.0110 and longitude 135.024, the regulating information indicates that the location information for the mobile device 20 will be published to the mobile devices 21 that are within a distance of 10 kilometers from the mobile device 20. In the case of the mobile device 20 with the device ID "3", which is located at latitude 35.0005 and longitude 135.002, the regulating information indicates that the location information for the mobile device 20 will be published to the mobile devices 21 that are within a distance of 1 kilometer from the mobile device 20.

Note that the storage portion 274 of the control server 40 may be the same sort of storage medium as the storage portion 224 of the mobile device 20, for example, a non-volatile memory such as an EEPROM, an EPROM, or the like, a magnetic disk such as a hard disk, a disk type magnetic medium, or the like, an optical disk such as a CD-R, a CD-RW, a DVD-R, a DVD-RW, a DVD+R, a DVD+RW, a DVD-RAM), a BD-R™, a BD-RE™, or the like, or an MO disk or the like.

The information acquisition portion 270 of the control server 40 acquires from each mobile device 20 information from which it is possible to estimate the location of the mobile device 20 (for example, the location information, a wireless context, or the like for the mobile device 201. The computation portion 272 computes the distances between the mobile devices 20 based on the information that the information acquisition portion 270 acquired, from which it is possible to estimate the location of each mobile device 20.

The transmission control portion 276 controls the information that is transmitted to the communication portion 266, based on the distances between the mobile devices 20 as computed by the computation portion 272 and the regulating information that is stored in the storage portion 274. For example, in a case where the mobile device 20 with the device ID "L" is located at latitude 35.0012 and longitude 135.012 and a mobile device 21 with a device ID "5" is 1 kilometer away, the transmission control portion 276 may prohibit the transmission of the location information for the mobile device 20 from the communication portion 266 to the mobile device 21 and transmit only the location alias for the mobile device 20.

Note that a case has been explain in which the regulating information includes the reference location for the mobile device 20, but the inclusion of the reference location for the mobile device 20 in the regulating information is not necessarily required. That is, the control server 40 may also control whether or not the location information for the mobile device 20 is published to the other mobile devices 21 based only on the distances between the mobile device 20 and the other mobile devices 21, regardless of the location of the mobile device 20.

2-3. Control Server Operation According to the Second Embodiment

Next, an information processing method that is executed in the mobile device 20 and the control server 40 according to the present embodiment will be explained with reference to FIGS. 19 and 20.

Figure 19:
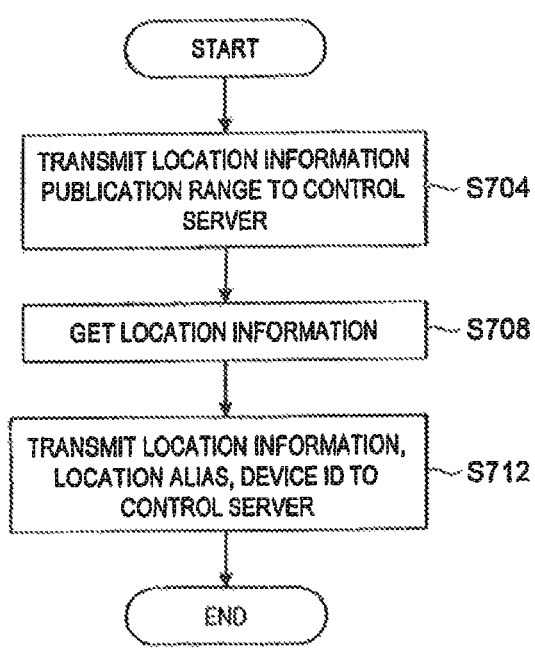
FIG. 19 is a flowchart that shows a flow of an operation of the mobile device according to the second embodiment.

FIG. 19 is a flowchart that shows a flow of an operation of the mobile device 20 according to the present embodiment. First, the mobile device 20 transmits to the control server 40, as the regulating information, the location information publication range that is set based on the user's operation of the setting operation portion 236 (step S704). Next, the information acquisition portion 220 acquires the location information for the mobile device 20 (step (S708). Then the communication portion 216 transmits the device ID and the location information for the mobile device 20 to the control server 40 (step S712). At this point, the mobile device 20 may also transmit the location alias for the mobile device 20 to the control server 40.

FIG. 20 is a flowchart that shows a flow of the information processing method that is executed by the control server 40 according to the present embodiment. First, the control server 40 receives the location information publication range as the regulating information from each mobile device 20 and stores the location information publication range in the storage portion 274 (step S750). Next, the information acquisition portion 270 receives the location information and the device ID for each mobile device 20 (step S754).

Next, the computation portion 272 computes the distances between the mobile devices 20 based on the location information for the mobile devices 20 that the information acquisition portion 270 received (step S7581. Then the transmission control portion 276 determines whether or not the distance between a certain mobile device A and another mobile device is within the location information publication range for the mobile device A, based on the regulating information that is stored in the storage portion 274 (step S762). If it is determined that the distance between the mobile device A and another mobile device is not within the location information publication range for the mobile device A, the transmission control portion 276 selects an unprocessed mobile device as the other mobile device, and the processing returns to step S762 (step S766).

If it is determined at step S762 that the distance between the mobile device A and another mobile device is within the location information publication range for the mobile device A, the transmission control portion 276 transmits the location information for the mobile device A to the other mobile device from the communication portion 266 (step S770). Next, the transmission control portion 276 determines whether or not the processing has been completed for all of the mobile devices other than the mobile device A (step S774). If the processing has not been completed for all of the mobile devices other than the mobile device A, the processing returns to step 766. If the processing has been completed for all of the mobile devices other than the mobile device A, the information processing method terminates. Note that in a case where the location alias of the mobile device A has been acquired, the transmission control portion 276 may transmit the location alias for the mobile device A to the other mobile device regardless of the distance between the mobile device A and the other mobile device.

3. CONCLUSION

As explained above, the mobile device 20 according to the first embodiment of the present invention can control whether or not its own location information is transmitted, according to its current location, that is, according to the current location of the user of the mobile device 20. This makes it possible to enhance the protection of the information that pertains to the current location of the mobile device 20 and of the user of the mobile device 20. The regulating information can also include the location alias, which expresses, in a different form, the associated location information in the storage portion 224. The transmission control portion 252 can transmit to the communication portion 216 the location alias that is included in the regulating information that is selected by the selection portion 248. Therefore, if the transmission control portion 252 transmits the location alias to the communication portion 216 based on the regulating information, it is possible to publish the information that corresponds to the location of the mobile device 20 without publishing the location information itself to third parties.

Furthermore, for the mobile device 20 according to the first embodiment of the present invention, the process of estimating the location of the mobile device 20 based on the received signal strengths of the signals that the mobile device 20 receives from each of the base stations 30 in the vicinity is not necessarily required. Therefore, the need to store the base station information in the mobile device 20 for each of the base stations 30 and the need to query the location estimation server that estimates the location of the mobile device 20 are eliminated. It thus becomes possible to scale back the hardware and reduce the processing load of the mobile device 20.

In addition, the control server 40 according to the second embodiment of the present invention can control whether or not the location information for the mobile device 20 is transmitted to the other mobile device 21, according to the distance between the mobile device 20 and the mobile device 21.

It should be understood by those skilled in the art that various modifications, combinations, sub-combinations and alterations may occur depending on design requirements and other factors insofar as they are within the scope of the appended claims or the equivalents thereof.

For example, each step of the processing in the mobile device 20 and the control server 40 in this specification does not necessarily have to be performed in a temporal sequence in the order shown in the flowcharts. Processing in which each step is performed in parallel or individually (for example, parallel processing or object-oriented processing) may also be included.

Further, in the explanation of the second embodiment, an example was explained in which the control server 40 performs the transmission of the location information for the mobile device 20 to the other mobile device 21, but the present invention is not limited to this example. For example, in a case where the control server 40 computes the distance between the mobile device 20 and the mobile device 21, and the computed distance is within the location information publication range for the mobile device 20, the control server 40 may permit the mobile device 20 to transmit the location information to the mobile device 21, and the mobile device 20 may transmit its own location information to the mobile device 21.

It is also possible to create a computer program that will cause the hardware that is built in to the mobile device 20 and the control server 40, such as the CPU, the ROM, the RAM, and the like, to exhibit functions that are equivalent to each structure in the mobile device 20 and the control server 40 described above. A storage medium may also be provided to store the computer program. Moreover, a series of processes can be implemented in hardware by structuring as hardware the functional blocks shown in the functional block diagrams in FIGS. 3 and 16.

What is claimed is:

1. A non-transitory computer-readable medium having embodied thereon a program, which when executed by a computer causes the computer to perform an information processing method, the method comprising:
   retrieving location information of an information processing apparatus and another information processing apparatus;
   setting a predetermined distance based on a user input;
   comparing the predetermined distance and a distance between the location information of the information processing apparatus and the location information of the another information processing apparatus to obtain a comparison result; and
   generating different display information based on the comparison result.

2. The non-transitory computer-readable medium of claim 1, wherein the generating different display information based on the comparison result comprises:
   when the comparison result indicates that the distance between the location information of the information processing apparatus and the location information of the another information processing apparatus is within the predetermined distance, generating location display information; and
   when the comparison result indicates that the distance between the location information of the information processing apparatus and the location information of the another information processing apparatus is not within the predetermined distance, generating location alias display information.

3. The non-transitory computer-readable medium of claim 2, wherein the generating different display information based on the comparison result further comprises:
   when the comparison result indicates that the distance between the location information of the information processing apparatus and the location information of the another information processing apparatus is not within the predetermined distance, prohibiting the generation of the location display information.

4. The non-transitory computer-readable medium of claim 1, wherein the predetermined distance is a range within which the location information for the information processing device will be published to the another location information processing device.

5. The non-transitory computer-readable medium of claim 4, wherein the generating different display information based on the comparison result comprises:
when the comparison result indicates that the distance between the location information of the information processing apparatus and the location information of the another information processing apparatus is within the predetermined distance, generating location display information indicating the location information of the information processing apparatus; and
when the comparison result indicates that the distance between the location information of the information processing apparatus and the location information of the another information processing apparatus is not within the predetermined distance, generating location alias display information indicating a location alias of the information processing apparatus.

6. The non-transitory computer-readable medium of claim 5, wherein the generating different display information based on the comparison result comprises:
when the comparison result indicates that the distance between the location information of the information processing apparatus and the location information of the another information processing apparatus is within the predetermined distance, transmitting the location display information indicating the location information of the information processing apparatus to the another information processing apparatus; and
when the comparison result indicates that the distance between the location information of the information processing apparatus and the location information of the another information processing apparatus is not within the predetermined distance, transmitting the location alias display information indicating a location alias of the information processing apparatus to the another information processing apparatus.

7. An information processing method, the method being executed via at least one processor having circuitry, and comprising:
retrieving location information of an information processing apparatus and another information processing apparatus;
setting a predetermined distance based on a user input;
comparing the predetermined distance and a distance between the location information of the information processing apparatus and the location information of the another information processing apparatus to obtain a comparison result; and
generating different display information based on the comparison result.

8. The information processing method of claim 7, wherein the generating different display information based on the comparison result comprises:
when the comparison result indicates that the distance between the location information of the information processing apparatus and the location information of the another information processing apparatus is within the predetermined distance, generating location display information; and
when the comparison result indicates that the distance between the location information of the information processing apparatus and the location information of the another information processing apparatus is not within the predetermined distance, generating location alias display information.

9. The information processing method of claim 8, wherein the generating different display information based on the comparison result further comprises:
when the comparison result indicates that the distance between the location information of the information processing apparatus and the location information of the another information processing apparatus is not within the predetermined distance, prohibiting the generation of the location display information.

10. The information processing method of claim 7, wherein the predetermined distance is a range within which the location information for the information processing device will be published to the another location information processing device.

11. The information processing method of claim 10, wherein the generating different display information based on the comparison result comprises:
when the comparison result indicates that the distance between the location information of the information processing apparatus and the location information of the another information processing apparatus is within the predetermined distance, generating location display information indicating the location information of the information processing apparatus; and
when the comparison result indicates that the distance between the location information of the information processing apparatus and the location information of the another information processing apparatus is not within the predetermined distance, generating location alias display information indicating a location alias of the information processing apparatus.

12. The information processing method of claim 11, wherein the generating different display information based on the comparison result comprises:
when the comparison result indicates that the distance between the location information of the information processing apparatus and the location information of the another information processing apparatus is within the predetermined distance, transmitting the location display information indicating the location information of the information processing apparatus to the another information processing apparatus; and
when the comparison result indicates that the distance between the location information of the information processing apparatus and the location information of the another information processing apparatus is not within the predetermined distance, transmitting the location alias display information indicating a location alias of the information processing apparatus to the another information processing apparatus.

13. A control server comprising:
circuitry configured to:
retrieve location information of an information processing apparatus and another information processing apparatus;
set a predetermined distance based on a user input;
compare the predetermined distance and a distance between the location information of the information processing apparatus and the location information of the another information processing apparatus to obtain a comparison result; and
generate different display information based on the comparison result.

14. The control server of claim 13, wherein the circuitry is further configured to:
when the comparison result indicates that the distance between the location information of the information processing apparatus and the location information of the another information processing apparatus is within the predetermined distance, generate location display information; and when the comparison result indicates that the distance between the location information of the information processing apparatus and the location information of the another information processing apparatus is not within the predetermined distance, generate location alias display information.

15. The control server of claim 13, wherein the circuitry is further configured to:

when the comparison result indicates that the distance between the location information of the information processing apparatus and the location information of the another information processing apparatus is not within the predetermined distance, prohibit the generation of the location display information.

16. The control server of claim 13, wherein the predetermined distance is a range within which the location information for the information processing device will be published to the another location information processing device.

17. The control server of claim 16, wherein the circuitry is further configured to:

when the comparison result indicates that the distance between the location information of the information processing apparatus and the location information of the another information processing apparatus is within the predetermined distance, generate location display information indicating the location information of the information processing apparatus; and when the comparison result indicates that the distance between the location information of the information processing apparatus and the location information of the another information processing apparatus is not within the predetermined distance, generate location alias display information indicating a location alias of the information processing apparatus.

18. The control server of claim 17, wherein the circuitry is further configured to:

when the comparison result indicates that the distance between the location information of the information processing apparatus and the location information of the another information processing apparatus is within the predetermined distance, transmit the location display information indicating the location information of the information processing apparatus to the another information processing apparatus; and when the comparison result indicates that the distance between the location information of the information processing apparatus and the location information of the another information processing apparatus is not within the predetermined distance, transmit the location alias display information indicating a location alias of the information processing apparatus to the another information processing apparatus.

* * * * *